(12) United States Patent (10) Patent No.: US 8,687,046 B2
Yu et al. (45) Date of Patent: Apr. 1, 2014

(54) THREE-DIMENSIONAL (3D) VIDEO FOR TWO-DIMENSIONAL (2D) VIDEO MESSENGER APPLICATIONS

(75) Inventors: Yang Yu, San Diego, CA (US); Seungwook Hong, San Diego, CA (US)

(73) Assignee: Sony Corporation, Tokyo (JP)

( * ) Notice: Subject to any disclaimer, the term of this patent is extended or adjusted under 35 U.S.C. 154(b) by 873 days.

(21) Appl. No.: 12/661,371

(22) Filed: Mar. 16, 2010

(65) Prior Publication Data

US 2011/0109725 A1 May 12, 2011

Related U.S. Application Data

(60) Provisional application No. 61/258,992, filed on Nov. 6, 2009.

(51) Int. Cl.
*H04N 13/02* (2006.01)

(52) U.S. Cl.
USPC .......................................................... 348/47

(58) Field of Classification Search
USPC ................ 348/47, 14.01, 14.08, 207.1, 14.04
See application file for complete search history.

(56) References Cited

U.S. PATENT DOCUMENTS

| | | | | |
|---|---|---|---|---|
| 4,429,328 A | * | 1/1984 | Jones et al. | 348/47 |
| 5,668,595 A | * | 9/1997 | Katayama et al. | 348/218.1 |
| 6,507,359 B1 | * | 1/2003 | Muramoto et al. | 348/47 |
| 6,784,901 B1 | | 8/2004 | Harvey et al. | |
| 6,839,082 B2 | * | 1/2005 | Lee et al. | 348/81 |
| 7,009,635 B2 | * | 3/2006 | Rantalainen | 348/136 |
| 7,873,848 B2 | * | 1/2011 | Nakahara et al. | 713/320 |
| 7,908,322 B2 | | 3/2011 | Eisenberg | |
| 8,009,897 B2 | * | 8/2011 | Xu et al. | 382/154 |
| 8,169,506 B2 | * | 5/2012 | Hayashi | 348/231.99 |
| 8,189,100 B2 | * | 5/2012 | Li et al. | 348/376 |
| 8,284,233 B2 | | 10/2012 | Bennett et al. | |
| 2003/0128273 A1 | | 7/2003 | Matsui | |

(Continued)

FOREIGN PATENT DOCUMENTS

| | | |
|---|---|---|
| CN | 201174743 | 12/2008 |
| KR | 10-2000-0058270 | 10/2000 |

(Continued)

OTHER PUBLICATIONS

Hytek General Stereo 3D Camera Driver, Hytek Automation website, 2006.*

(Continued)

*Primary Examiner* — Sath V Perungavoor
*Assistant Examiner* — James Pontius
(74) *Attorney, Agent, or Firm* — Miller Patent Services; Jerry A. Miller

(57) ABSTRACT

Three-dimensional (3D) video is provided to a legacy two-dimensional (2D) video messenger application. A request for video content from a single video camera is received at a camera interface module from the 2D video messenger application. The request for video content from the single video camera is forwarded to a video processing offload module. A first video camera and a second video camera are controlled. Merged 3D video content from the video processing offload module is received. The merged 3D video content is sent to the 2D video messenger application in response to receipt of the merged 3D video content from the video processing offload module. This abstract is not to be considered limiting, since other embodiments may deviate from the features described in this abstract.

64 Claims, 10 Drawing Sheets

(56) References Cited

U.S. PATENT DOCUMENTS

| | | | |
|---|---|---|---|
| 2003/0156188 A1* | 8/2003 | Abrams, Jr. | 348/51 |
| 2003/0202089 A1* | 10/2003 | Alhadef et al. | 348/42 |
| 2004/0207719 A1 | 10/2004 | Tervo et al. | |
| 2005/0138546 A1 | 6/2005 | AbiEzzi | |
| 2005/0259147 A1 | 11/2005 | Nam | |
| 2006/0242678 A1* | 10/2006 | Kostadinovich | 725/105 |
| 2006/0285832 A1 | 12/2006 | Huang | |
| 2007/0174876 A1 | 7/2007 | Maggio et al. | |
| 2007/0279415 A1* | 12/2007 | Sullivan et al. | 345/427 |
| 2008/0049107 A1* | 2/2008 | Hii et al. | 348/207.1 |
| 2008/0100805 A1* | 5/2008 | Majumder et al. | 353/30 |
| 2008/0170806 A1 | 7/2008 | Kim | |
| 2008/0256591 A1* | 10/2008 | Li | 725/136 |
| 2009/0046138 A1 | 2/2009 | AbiEzzi | |
| 2009/0172746 A1 | 7/2009 | Aldrey et al. | |
| 2009/0228945 A1 | 9/2009 | Yaussy | |
| 2009/0237495 A1* | 9/2009 | Kawahara | 348/56 |
| 2009/0244023 A1 | 10/2009 | Kim et al. | |
| 2010/0007716 A1* | 1/2010 | Lee et al. | 348/43 |
| 2010/0260426 A1* | 10/2010 | Huang et al. | 382/218 |
| 2011/0228052 A1* | 9/2011 | Ohnishi et al. | 348/47 |
| 2012/0007943 A1* | 1/2012 | Tytgat | 348/14.08 |

FOREIGN PATENT DOCUMENTS

| | | |
|---|---|---|
| KR | 10-2006-0020435 | 3/2006 |
| WO | WO 00/60849 | 10/2000 |
| WO | WO 2006/121365 | 11/2006 |
| WO | WO 2007/136167 | 11/2007 |

OTHER PUBLICATIONS

International Search Report and Written Opinion; PCT/US2010/053759; dated Jun. 24, 2011; Received Jul. 19, 2011.

"MSN TV 2 Takes You to the Future of TV: Review," posted by Fabien Montique, MSN TV website, Jan. 21, 2006.

"Minoru 3D Webcam," Firebox website, 2009.

"HYTEK General Stereo 3D Camera Driver," Hyteck Automation website, 2006.

"Personalized IPTV Services using Web-based Open Platform in NGN," Lee et al., Global Telecommunications Conference 2008.

NDJE, Theodore, USPTO Examiner, Final Office Action U.S. Appl. No. 12/661,372, Oct. 23, 2012.

Takemura et al., Stereoscopic Video Movie Camera Using 300K Pixel IT-CCD Sensors, IEEE Transactions on Consumer Electronics, vol. 37, No. 1, Feb. 1991.

NDJE, Theodore, USPTO Examiner, Office Action, U.S. Appl. No. 12/661,372, Jan. 30, 2013.

Extended European Search Report, Corresponding European Application No. 100828808.5, Received May 16, 2013.

Dimitropoulos, K. et al., "3 D Content Generation for Autostereoscopic Displays," IEEE, 2009.

* cited by examiner

US 8,687,046 B2

THREE-DIMENSIONAL (3D) VIDEO FOR TWO-DIMENSIONAL (2D) VIDEO MESSENGER APPLICATIONS

CROSS REFERENCE TO RELATED DOCUMENTS

This application claims priority to and claims the benefit of U.S. Provisional Application Ser. No. 61/258,992 filed on Nov. 6, 2009, titled "3D VIDEO EXPERIENCE FOR EXISTING VIDEO MESSENGER APPLICATIONS," which is hereby incorporated herein by reference in its entirety; and this application is related to concurrently filed U.S. utility patent application Ser. No. 12/661,372, titled "AUTOMATED WIRELESS THREE-DIMENSIONAL (3D) VIDEO CONFERENCING VIA A TUNERLESS TELEVISION DEVICE," which is incorporated herein by reference in its entirety.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Two-dimensional (2D) video messenger applications, such as Yahoo® Messenger, Google Talk®, and Skype®, provide interconnection capabilities for communication between networked computing devices. These 2D video messenger applications provide for 2D video communication between the networked computing devices by use of a single video camera, such as a webcam, associated with each of the networked computing devices.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
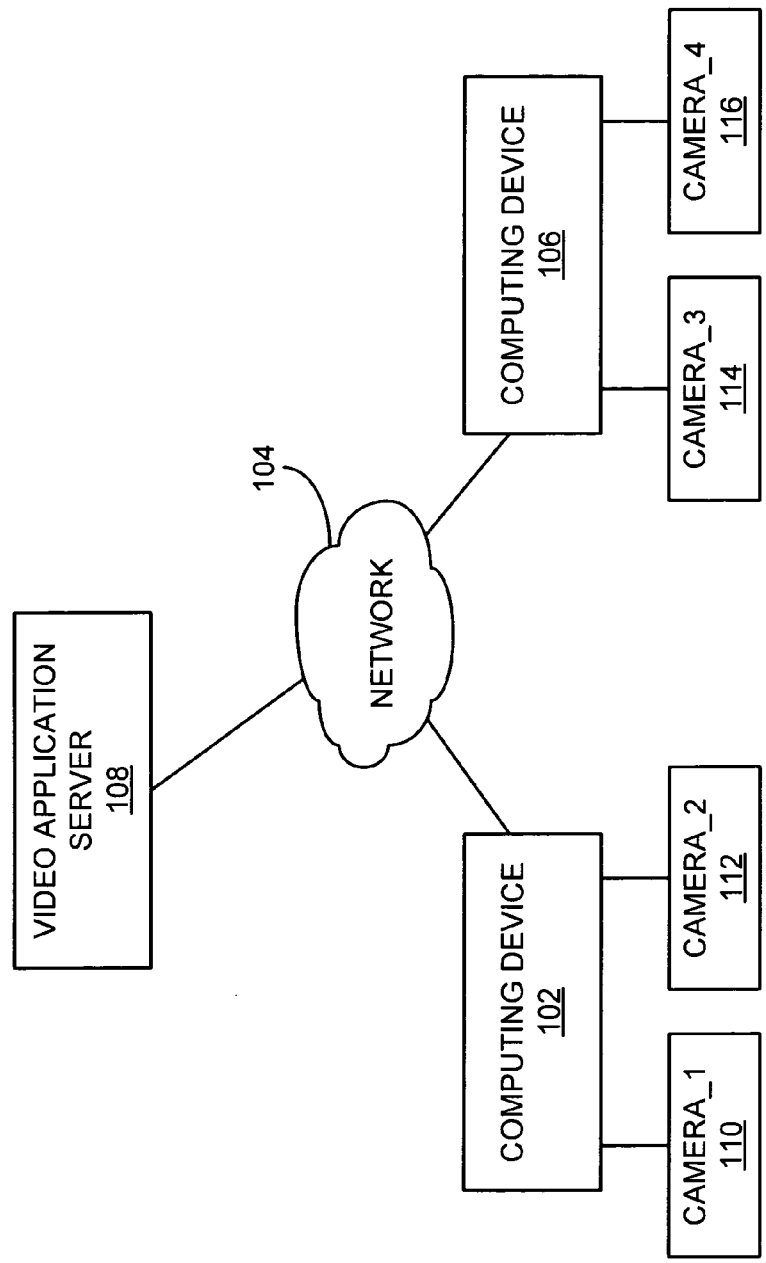
FIG. 1 is a block diagram of an example of an implementation of a system that provides automated three-dimensional (3D) video for two-dimensional (2D) video messenger applications consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system having one or more processors.

Reference throughout this document to "one embodiment," "certain embodiments," "an embodiment," "an implementation," "an example" or similar terms means that a particular feature, structure, or characteristic described in connection with the example is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

The present subject matter provides automated three-dimensional (3D) video for two-dimensional (2D) video messenger applications. The present subject matter provides a processing platform that supports generation, transport, and presentation of 3D video over legacy (e.g., existing) 2D video messenger applications.

For purposes of the description, it is understood that legacy 2D video messenger applications send requests directed to a single camera device, such as a webcam, associated a networked computing device. The requests include requests such as camera open requests, camera close requests, set format requests, set parameter requests, frame buffer query requests, de-queue video requests, and other requests directed to the single camera device. Further, the program code associated with the instant messenger applications is proprietary and not available for modification. The present subject matter provides the automated three-dimensional (3D) video for two-dimensional (2D) video messenger applications over the existing legacy 2D video messenger applications without requiring modification of this proprietary program code.

As such, the existing legacy 2D video messenger applications may continue to generate requests associated with a single video camera device without change. At a networked computing device, a camera interface module (e.g., a device driver software or hardware module) is configured to receive requests associated with a single video camera from a legacy 2D video messenger application. The camera interface module is also configured to interface with two video cameras, rather than a single camera as expected by the legacy video messenger application. Upon receipt of such a request from a legacy video messenger application, the camera interface module generates camera control signals for each of the two video cameras. Video content is received from both video cameras and merged into 3D video content and returned in response to the request for video content from the single video camera received from the legacy video messenger application. This 3D video content is delivered by the legacy video messenger application to another networked computing device without awareness that it is not delivering 2D video content. At the networked computing device that receives the 3D video content, post-processing is performed to render the 3D video content, again with no change to the existing legacy 2D video messenger application.

For implementations where kernel code space or execution occupancy is limited on the networked computing device responsible for generating 3D video content, a video processing offload module is utilized to move the 3D processing and computational load to a user space application and/or a hardware module. As such, kernel code space and execution occupancy constraints for a processor operating the kernel code may be observed with increased 3D processing load capabilities offloaded to the 3D processing module.

For such an implementation, upon receipt of a request for video content from a single video camera, the camera interface module generates camera control signals based upon the request for video content from the single video camera to generate video content from a first video camera, forwards the request to the video processing offload module, and generates camera control signals to generate video content from the second video camera in response to receipt of the request from the video processing offload module. As such, the camera interface module identifies the request as a request for video content from a single video camera, processes the request via the video processing offload module, and controls generation of video content from both video cameras.

The video processing offload module receives the request for video content from the single video camera and sends the request for video content from the second video camera to the camera interface module. The camera interface module receives the request and generates camera control signals based upon that request for the second video camera. The camera interface module receives video content from each video camera and forwards the received video content from both video cameras to the video processing offload module. The video processing offload module merges the video content received from the first video camera and the video content received from the second video camera into three-dimensional (3D) video content. The video processing offload module sends the merged 3D video content to the legacy 2D video messenger application via the camera interface module in response to the request for the video content from the single video camera. The legacy 2D video messenger application forwards the 3D video content to a receiving networked computing device. That receiving networked computing device identifies the received video content as 3D video content and post-processes the received 3D video content for rendering on a display associated with the receiving networked computing device.

For purposes of the present subject matter, it is understood that several forms of 3D content are presently available. For example, 3D video content may be encoded for polarized, frame sequential, or 3D-capable display output devices. For polarized encoding, 3D video content may be generated by merging left and right images in either a side-by-side or top-and-bottom format on each frame of video content. At rendering, these images are scaled and formatted with opposite circular polarization onto odd and even lines of each displayed video frame, respectively. Passive polarized 3D glasses are used to present the left and right eye images to the viewer. Alternatively, a frame sequential format operating at twice the frame rate of polarized encoding may be used such that each of the left and right images is sequentially rendered. Active 3D glasses are used to synchronize with and select which lens is active for each sequential frame. Resolution of 3D imaging may be compromised using either of the described 3D encoding and rendering options. Alternatively, 3D-capable displays are available that perform the conversion of 3D video content to a 3D rendered output and may have a higher rendering resolution for 3D content than either of the approaches that use passive or active glasses. It should be understood that the present subject matter applies to the above-described and any other 3D video content encoding and rendering formats. It is also understood that a person of ordinary skill in the art will be able to implement the present subject matter based upon the present description. As such, further details of 3D encoding and rendering will not be described herein.

It is also understood that 3D calibration and 3D rectification activities may be performed to align the merged left and right images. The 3D calibration may be performed by detecting an edge and a corner of an image held in front of the cameras that generate the left and right images. The 3D rectification may be performed by estimating a positional relationship between the cameras that generate the left and right images. At least one of the left and right images may be adjusted based upon the estimated positional relationship between the cameras by obtaining warping matrixes to be applied to the images and applying the warping matrixes to the left and right images received from the two video cameras. It is understood that a person of ordinary skill in the art would be able to calibrate and rectify images as described herein based upon the description of the present subject matter contained herein.

Turning now to FIG. 1, FIG. 1 is a block diagram of an example of an implementation of a system 100 that provides automated three-dimensional (3D) video for two-dimensional (2D) video messenger applications. A computing device 102 interconnects via a network 104 with a computing device 106 and a video application server 108. The video application server 108 provides storage and download access capabilities for a legacy 2D video messenger application. Upon download and installation of the legacy 2D video messenger application by each of the computing device 102 and the computing device 106, the 2D video messenger application provides either peer-to-peer interconnection or server-controlled interconnection capabilities, based upon the given implementation, for video conferencing between the computing device 102 and the computing device 106. For the peer-to-peer implementation, the installed 2D video messenger application on either of the computing devices 102 and 106 may initiate a video conference session and messages may be forwarded to the other computing device via the network 104. For the server-controlled implementation, the video application server 108 may communicate with the installed 2D video messenger application to receive and forward all messages associated with a video conference between the computing device 102 and the computing device 106.

A camera_1 110 and a camera_2 112 are associated with the computing device 102. A camera_3 114 and a camera_4 116 are associated with the computing device 106. As such, for purposes of the present example, both the computing device 102 and the computing device 106 are configured for generation of 3D video for 2D video messenger applications. It is also understood that both the computing device 102 and the computing device 106 may be configured to identify received 3D content and render that 3D content to a user of the respective computing device. It should further be noted that either the computing device 102 or the computing device 106 may communicate with computing devices that have only one camera for outgoing video generation. In such a situation, such a device may be configured to process received 3D video for 2D video messenger applications associated with the present subject matter.

The computing devices 102 and 106 may include devices such as a set top box (STB), a personal computer (PC), a personal digital assistant (PDA), a mobile phone, or other mobile device (none shown), or other device capable of downloading, installing, and executing a 2D video messenger application. The camera_1 110, the camera_2 112, the camera_3 114, and the camera_4 116 may be any form of camera suitable for the intended implementation. For example, the cameras 110 through 116 may include a webcam or other camera suitable for use for capturing images at the respective computing devices.

The video application server 108 may be any network-based server accessible via the network 104. Examples of web-based servers that are presently within the marketplace are Yahoo® Messenger servers, Google Talk® servers, and Skype® servers. Many other network accessible web-based servers exist and many others are contemplated by the present subject matter. Accordingly, all such network-accessible web-based servers are considered within the scope of the present subject matter.

The network 104 may include any form of interconnection suitable for the intended purpose, including a private or public network such as an intranet or the Internet, respectively, direct inter-module interconnection, dial-up, wireless, or any other interconnection mechanism capable of allowing communication between devices. An example of a web-based protocol suitable for providing communication over the network 104 is the transmission control protocol over Internet protocol (TCP/IP). Markup language formatting, such as the hypertext transfer protocol (HTTP) and extensible markup language (XML) formatting, may be used for messaging over the TCP/IP connection with devices accessible via the network 104. Other web protocols exist and all are considered within the scope of the present subject matter.

For purposes of the present description, the term "real time" shall include what is commonly termed "near real time"—generally meaning any time frame of sufficiently short duration as to provide reasonable response time for on demand information processing acceptable to a user of the subject matter described (e.g., within a few seconds or less than ten seconds or so in certain systems). These terms, while difficult to precisely define are well understood by those skilled in the art. It is further understood that the subject matter described herein may be performed in real time and/or near real time.

Figure 2:
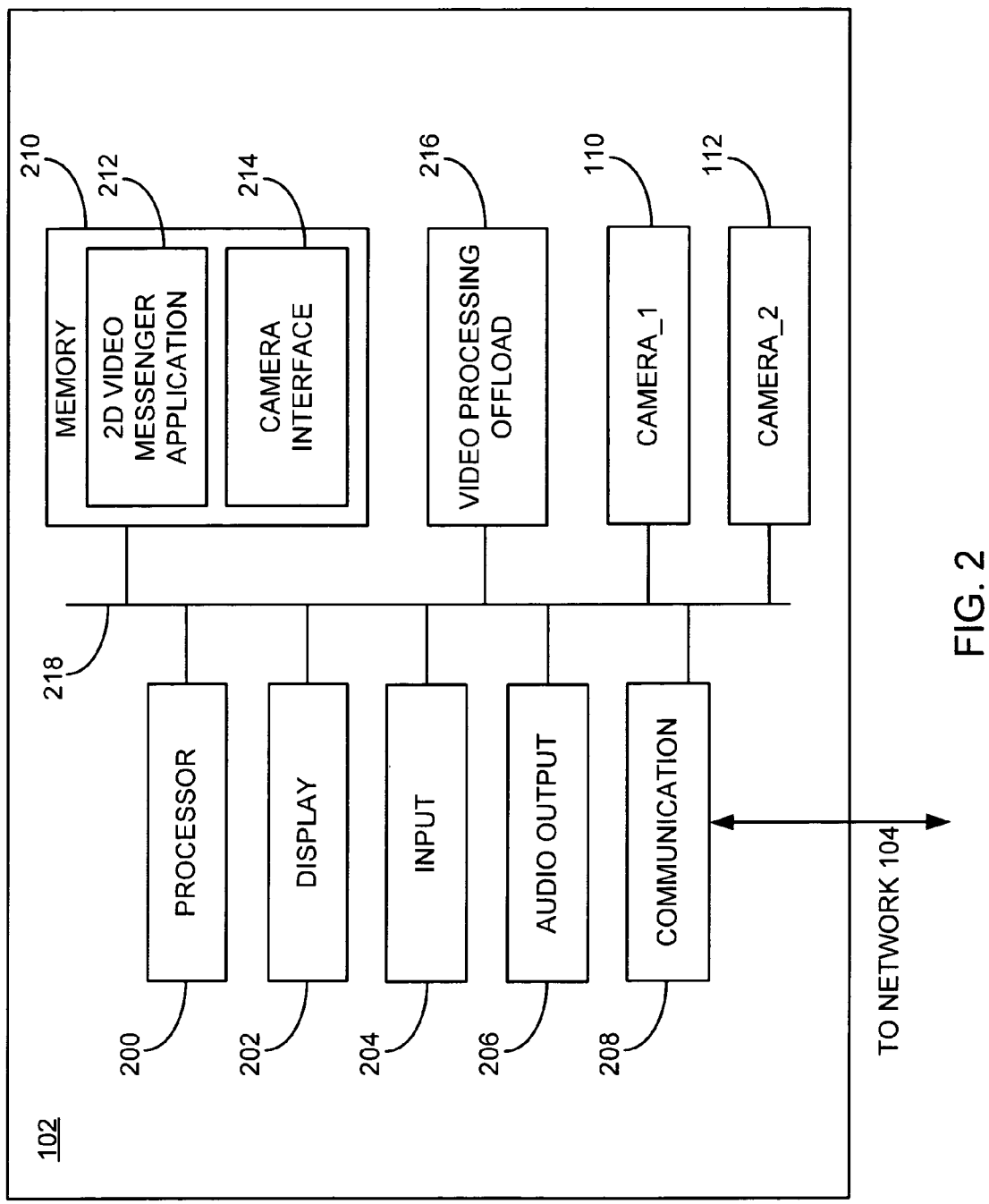
FIG. 2 is a block diagram of an example of an implementation of a computing device that provides automated 3D video for 2D video messenger applications consistent with certain embodiments of the present invention.

FIG. 2 is a block diagram of an example of an implementation of the computing device 102 that provides automated 3D video for 2D video messenger applications. It is understood that the present description of the computing device 102 also applies to the computing device 106. However, as described above, either the computing device 102 or the computing device 106 may communicate with computing devices that have only one camera for outgoing video generation. In such a situation, such a device may be configured to process received 3D video for 2D video messenger applications associated with the present subject matter.

A processor 200 provides computer instruction execution, computation, and other capabilities within the computing device 102. A display device 202 provides visual and/or other information to a user of the computing device 102. The display device 202 may include any type of display device, such as a cathode ray tube (CRT), liquid crystal display (LCD), light emitting diode (LED), projection or other display element or panel. An input device 204 provides input capabilities for the user of the computing device 102. The input device 204 may include a mouse, pen, trackball, or other input device. One or more input devices, such as the input device 204, may be used.

An audio output device 206 provides audio output capabilities for the computing device 102, such as verbal communication associated with a video conference as described above and in more detail below. The audio output device 206 may include a speaker, driver circuitry, and interface circuitry as appropriate for a given implementation.

A communication module 208 provides communication capabilities for interaction with the computing device 106 and the video application server 108 for downloading and installing the 2D video messenger application and for communicating during a video conference with the respective device(s) via the network 104.

It should be noted that the communication module 208 is illustrated as a component-level module for ease of illustration and description purposes. It is also understood that the communication module 208 includes any hardware, programmed processor(s), and memory used to carry out the functions of the communication module 208. For example, the communication module 208 may include additional controller circuitry in the form of application specific integrated circuits (ASICs), processors, and/or discrete integrated circuits and components for performing electrical control activities associated with the communication module 208. Additionally, the communication module 208 may include interrupt-level, stack-level, and application-level modules as appropriate. Furthermore, the communication module 208 may include any memory components used for storage, execution, and data processing by these modules for performing processing activities associated with the communication module 208. The communication module 208 may also form a portion of other circuitry described below without departure from the scope of the present subject matter.

A memory 210 includes a 2D video messenger application 212 and a camera interface module 214. The 2D video messenger application 212 represents an application downloaded and installed from the video application server 108, as described above, for 2D video messaging. The camera interface module 214 includes driver and communication capabilities for interfacing the computing device 102 with the camera_1 110 and the camera_2 112.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, a code execution area, and a data area suitable for storage of the information and storage and execution of the respective applications and any firmware associated with a programmed processor that forms a portion of other components associated with the computing device 102, as appropriate. It is also understood that other information may also be stored within the memory 210 as appropriate for a given implementation without departure from the scope of the present subject matter.

As described in more detail below, the camera interface module 214 also interfaces with the 2D video messenger application 212 to provide appropriate interface signaling for the 2D video messenger application 212. Upon receipt of signaling and/or requests from the 2D video messenger application 212 directed to a single video camera, the camera interface module 214 generates control signals based upon the signaling and/or requests directed to the single video camera and directs those control signals, as described in more detail below, to both of the camera_1 110 and the camera_2 112 to provide a two-camera interface for the computing device 102. The video content received from both of the camera_1 110 and the camera_2 112 is combined to form 3D video content. The 3D video content is returned to the 2D video messenger application 212 in response to the signaling and/or requests directed to a single video camera. As such, the camera interface module 214 provides an interface that allows the computing device 102 to provide 3D video over the existing 2D video messenger application 212 without requiring a change to the existing 2D video messenger application 212.

The camera interface module 214 includes instructions executable by the processor 200 for performing these and other functions. The camera interface module 214 may form a portion of an interrupt service routine (ISR), a portion of an operating system, or a portion of a separate application without departure from the scope of the present subject matter.

It should be noted that the present example describes the camera interface module 214 in operation as a low-level driver. As such, the camera interface module 214 may be considered a driver and may be considered part of a kernel space for operations performed by the processor 200. To limit processing burden on the kernel space of the processor 200, the 3D video processing of the computing device 102 is performed outside of the kernel space of the processor 200.

A video processing offload module 216 provides the 3D video processing capabilities for the computing device 102 associated with the present subject matter. As described in more detail below, the camera interface module 214 forwards certain signaling and/or requests that are originated by the 2D video messenger application 212 to the video processing offload module 216. The video processing offload module 216 responds to those requests and directs them to the camera_1 110 and the camera_2 112. The video processing offload module 216 receives video output and responses to signaling and/or requests from the camera_1 110 and the camera_2 112 and creates 3D video or combined responses to the signaling and/or requests and returns them to the 2D video messenger application 212 via the camera interface module 214.

While the present examples described above and in more detail below depict certain signaling interconnections for ease of description purposes, it is understood that different signaling interconnections may be used without departure from the scope of the present subject matter. For example, the present examples are described with the camera interface module 214 receiving incoming requests from the 2D video messenger application 212, generating control signals for the first cameral_110, and routing the requests to the video processing offload module 216. The video processing offload module 216 forwards the requests back to the camera interface module 214, and the camera interface module 214 generates control signals for the second camera_2 112. However, this should not be considered limiting. While the present examples are described with the video processing offload module 216 routing all signaling through the camera interface module 214 to the camera_1 110 and the camera_2 112, the video processing offload module 216 may directly interface with the camera_1 110 and the camera_2 112 without departure from the scope of the present subject matter. Many other variations are possible and all are considered within the scope of the present subject matter.

It should be noted that the video processing offload module 216 is illustrated as a component-level module for ease of illustration and description purposes. It is also understood that the video processing offload module 216 includes any hardware, programmed processor(s), and memory used to carry out the functions of the video processing offload module 216 as described above and in more detail below. For example, the video processing offload module 216 may include additional controller circuitry in the form of application specific integrated circuits (ASICs), processors, and/or discrete integrated circuits and components for performing electrical control activities associated with the video processing offload module 216. Additionally, the video processing offload module 216 may include interrupt-level, stack-level, and application-level modules as appropriate. Furthermore, the video processing offload module 216 may include any memory components used for storage, execution, and data processing for performing processing activities associated with the video processing offload module 216.

It should be noted that the video processing offload module 216 may also form a portion of other circuitry described below without departure from the scope of the present subject matter. Further, the video processing offload module 216 may alternatively be implemented as an application stored within the memory 210. In such an implementation, the video processing offload module 216 may include instructions executed by the processor 200 for performing the functionality described herein. The processor 200 may execute these instructions to provide the processing capabilities described above and in more detail below for the computing device 102.

The video processing offload module 216 may form a portion of an interrupt service routine (ISR), a portion of an operating system, or a portion of a separate application without departure from the scope of the present subject matter.

The processor 200, the display device 202, the input device 204, the audio output device 206, the communication module 208, the memory 210, the video processing offload module 216, the camera_1 110, and the camera_2 112 are interconnected via one or more interconnections shown as interconnection 218 for ease of illustration. The interconnection 218 may include a system bus, a network, or any other interconnection capable of providing the respective components with suitable interconnection for the respective purpose.

Furthermore, components within the computing device 102 may be co-located or distributed within a network without departure from the scope of the present subject matter. For example, the components within the computing device 102 may be located within a stand-alone device, such as a personal computer (e.g., desktop or laptop) or handheld device (e.g., cellular telephone, personal digital assistant (PDA), email device, music recording or playback device, etc.). For a distributed arrangement, the display device 202 and the input device 204 may be located at a kiosk, while the processor 200 and the memory 210 may be located at a local or remote server. Many other possible arrangements for the components of the computing device 102 are possible and all are considered within the scope of the present subject matter.

Figure 3:
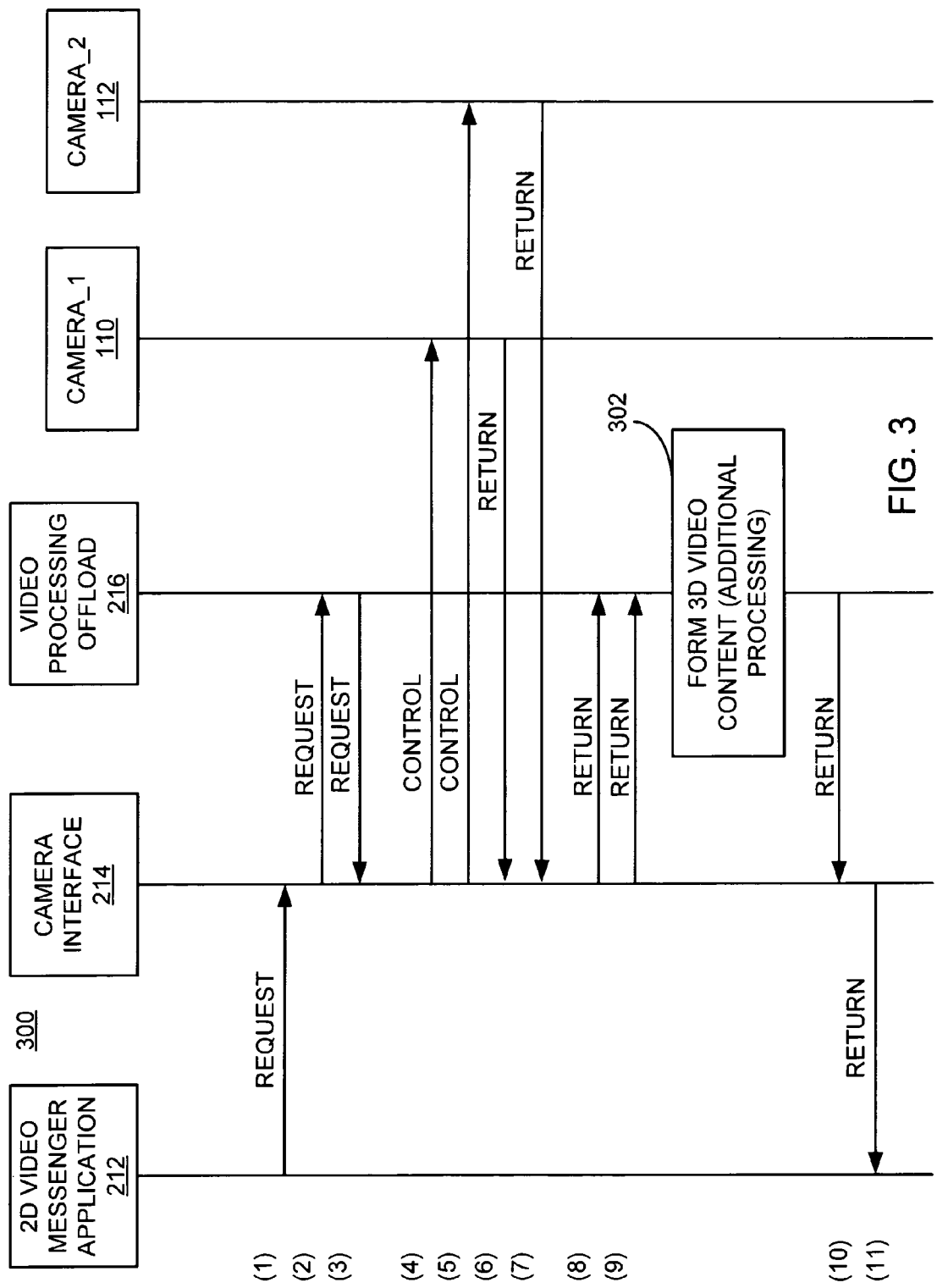
FIG. 3 is a message flow diagram of an example of an implementation of a message and video content message flow for providing automated 3D video for 2D video messenger applications consistent with certain embodiments of the present invention.

FIG. 3 is a message flow diagram of an example of an implementation of a message and video content message flow 300 for providing automated 3D video for 2D video messenger applications. The 2D video messenger application 212 sends a request for video content from a single video camera to the camera interface module 214 (line 1). In response to receipt of the request for video content from a single video camera, the camera interface module 214 forwards the request to the video processing offload module 216 (line 2). In response to receipt of the request, the video processing offload module 216 sends the same request for the second camera back to the camera interface module 214 (line 3).

In response to receipt of the request from the video processing offload module 216, the camera interface module 214 generates control information and commands (e.g., control signals) and sends the generated control information and commands to the camera_1 110 and the camera_2 112 (lines 4 and 5, respectively). The camera_1 110 and the camera_2 112 process the respective control information and commands, and return video content to the camera interface module 214 (lines 6 and 7, respectively).

The camera interface module 214 returns the video content received from the camera_1 110 and the camera_2 112 to the video processing offload module 216 for processing (lines 8 and 9, respectively). In response to receipt of the video content, the video processing offload module 216 forms 3D video content and performs any additional processing at block 302.

As discussed above and in more detail below, the video processing offload module 216 may perform any 3D formatting appropriate for a given implementation. Additionally, the video processing offload module 216 may perform visual affects to change the resulting merged 3D video content. Changing the video content may include changing a portion of a first video content received from the first video camera, camera_1 110, and a portion of a second video content received from the second video camera, camera_2 112. As such, a change to the 3D video content may be made by changing portions of the individual video content received from each of the cameras. A request to change the video content may be received either from a user interface or via a network connection from another computing device. The request to change a portion of the merged 3D video content may include a request to smooth a facial feature of an image of a person, a request to thin face or body image of a person, a request to stretch a portion of any image, or any other change to the merged 3D video content. As such, the video processing offload module 216 may perform image enhancement and image changes to the merged 3D video content for practical and entertainment purposes.

In response to receipt of a request to change a portion of the merged 3D video content, the video processing offload module 216 may detect the portion of the merged 3D video content within each of the first content received from the first video camera, camera_1 110, and may detect the portion of the merged 3D video content within each of the second content received from the second video camera, camera_2 112. In response to detecting the portion of the merged 3D video content to be changed within each of the respective video content, the video processing offload module 216 may change the requested portion of the video content. It should also be noted, that the change to the merged 3D video content may be performed either prior to or after the two video content elements have been merged, as appropriate for a given implementation.

Upon completion of the processing of the returned video content to form the merged 3D video content and any additional processing at block 304, the video processing offload module 216 returns the merged 3D video content to the camera interface module 214 (line 10). The camera interface module 214 then returns the merged 3D video content to 2D messenger application 212 (line 11). As such, the camera interface module 214 and video processing offload module 216 provide automated 3D video for 2D video messenger applications. Further, the existing 2D video messenger application 212 does not need to be changed.

Figure 4:
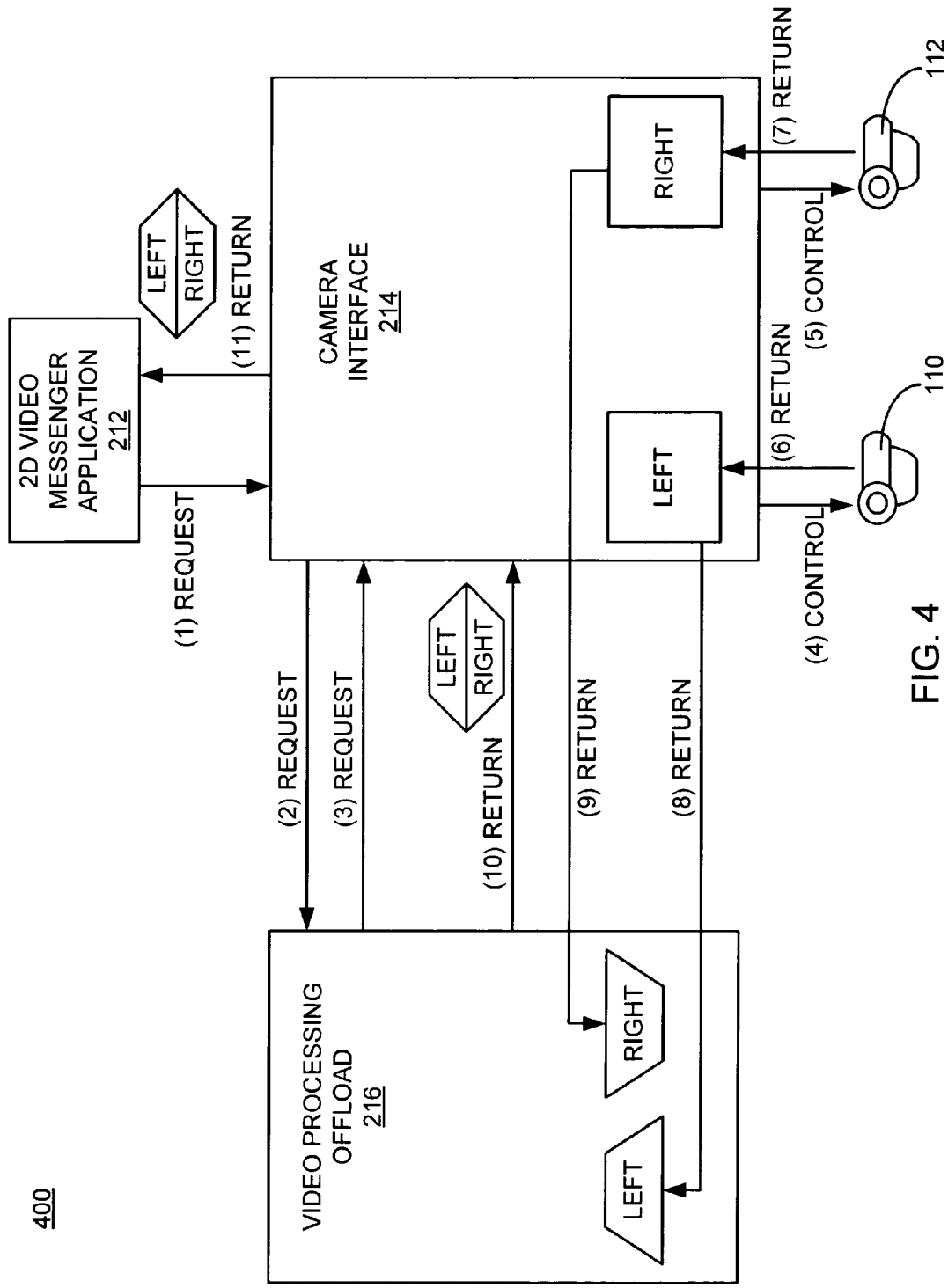
FIG. 4 is a message and video content flow architectural diagram of an example of an implementation of the message and video content flow of FIG. 3 within the architecture of a computing device consistent with certain embodiments of the present invention.

FIG. 4 is a message and video content flow architectural diagram of an example of an implementation of the message and video content flow 400 of FIG. 3 within the architecture of the computing device 102. As can be seen from FIG. 4, the line numbers that reference the messages and content return paths within FIG. 3 are maintained within FIG. 4 for ease of representation. The description of the messages and content return paths, as described above, is incorporated by reference with respect to the description of FIG. 4. It should be noted within FIG. 4 that the camera_1 110 and the camera_2 112 are represented as returning left and right video content, respectively, for the video content returned to the camera interface module 214. Further, the left and right video content is returned to the video processing offload module 216 (lines 8 and 9, respectively, within both FIG. 3 and FIG. 4). The merged 3D video is shown returned via the camera interface module 214 to the 2D video messenger application 212 (lines 10 and 11, respectively, within both FIG. 3 and FIG. 4). As such, the message and video content flow architectural diagram 400 provides a mapping of the message flow of FIG. 3 onto the architecture of the computing device 102.

Figure 5:
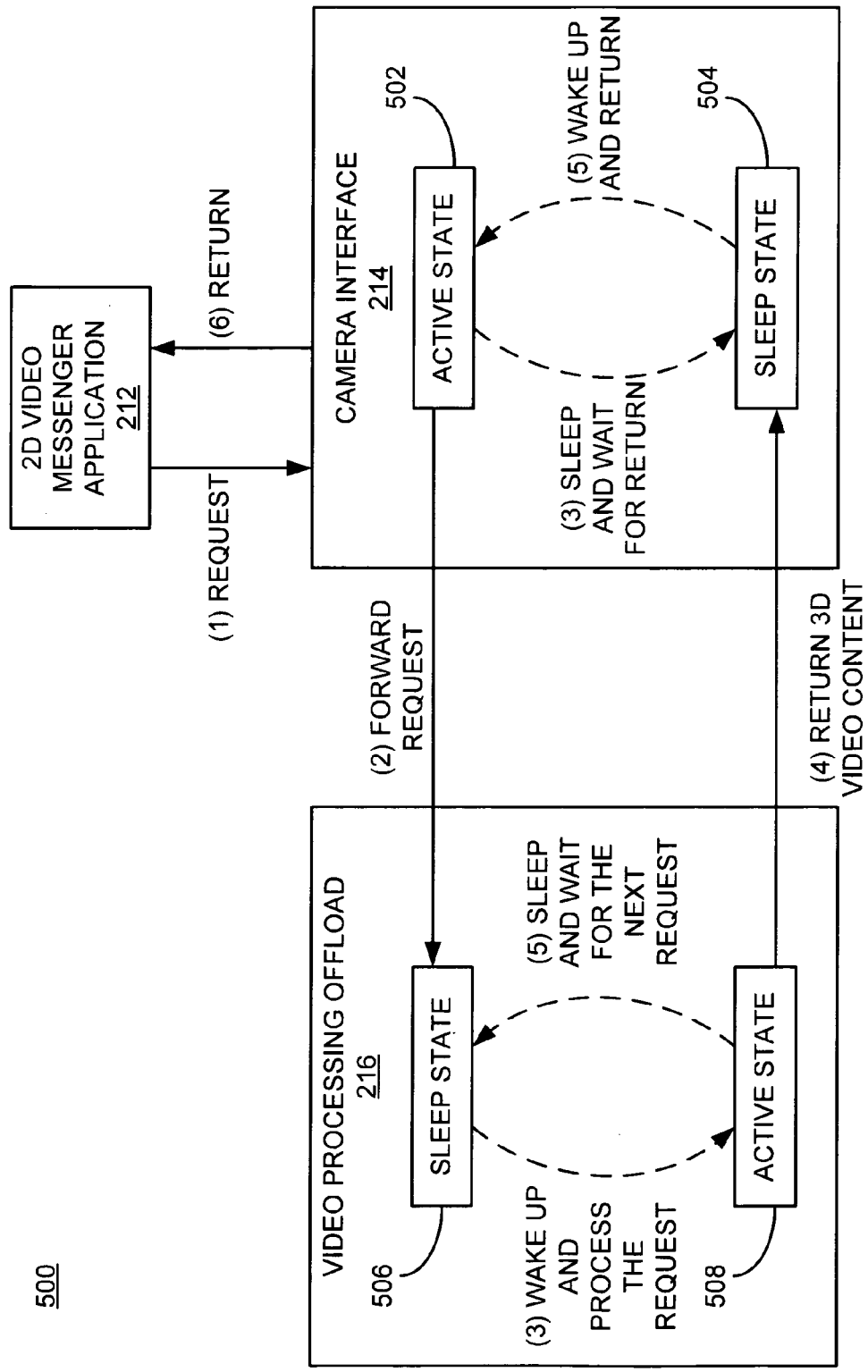
FIG. 5 is an architectural state diagram of an example of an implementation of a state-oriented process for automated 3D video for 2D video messenger applications consistent with certain embodiments of the present invention.

FIG. 5 is an architectural state diagram of an example of an implementation of a state-oriented process 500 for automated 3D video for 2D video messenger applications. FIG. 5 also shows the 2D video messenger application 212, the camera interface module 214, and the video processing offload module 216. It should be noted that the messaging and state transition sequence numbers of FIG. 5 do not necessarily map to the line numbers of FIG. 3 and FIG. 4.

Upon receipt of a request for video content from the 2D video messenger application 212, the camera interface module 214 enters an active state at 502. As described above, the camera interface module 214 forwards the request to the video processing offload module 216 (line 2). The camera interface module 214 transitions from the active state at 502 to a sleep state at 504 and waits for return of 3D video content (dashed line 3 within the camera interface module 214).

In response to receipt of the forwarded request, the video processing offload module 216 transitions from a sleep state at 506 to an active state at 508 (e.g., wakes up) to process the received request (dashed line 3 within the video processing offload module 216). The video processing offload module 216 processes left and right video content received from the camera_1 110 and the camera_2 112, respectively (as illustrated in FIG. 4), and merges the two into the 3D video content.

The video processing offload module 216 returns the 3D video content to the camera interface module 214 (line 4). The video processing offload module 216 transitions from the active state at 508 to the sleep state at 506 to await a new request (dashed line 5 within the video processing module 216).

In response to receipt of returned 3D video content, the camera interface module 214 transitions from the sleep state at 504 to the active state at 502 (e.g., wakes up, dashed line 5 within the camera interface module 214). The camera interface module 214 returns the 3D video content to the 2D video messenger application 212 (line 6).

As such, processing of requests for video content between the camera interface module 214 and the video processing offload module 216 may be stateful (e.g., state-oriented) to allow each module to enter a sleep state upon completion of its respective processing and to transition back to an active state upon receipt of the returned 3D video content or a forwarded request for video content, respectively.

It should be noted that certain additional processing described above in other examples has been omitted from the description of FIG. 5 for ease of description purposes. However, it is understood that such additional processing may be performed without departure from the scope of the present subject matter as appropriate for a given implementation.

Based upon the message flows and architectural diagrams described above, the following additional examples of message flows and events may be applied by the camera interface module 214 in conjunction with the video processing offload module 216. For example, if a request is received by the camera interface module 214 to open a single video camera, the video processing offload module 216 will open the second video camera. Similarly, if a request is received by the camera interface module 214 to close a single video camera, the video processing offload module 216 will close the second video camera. If a request is received by the camera interface module 214 to set a format for output associated with the single video camera, the video processing offload module 216 will set a format for output associated with the second video camera. If a request is received by the camera interface module 214 to set an operational parameter associated with the single video camera, the video processing offload module 216 will set an operational parameter associated with the second video camera. Many other requests are possible and all are considered within the scope of the present subject matter.

If a request is received by the camera interface module 214 to allocate a number of frame buffers in association with a single camera, the video processing offload module 216 will request the same number of frame buffers to be allocated in association with the second camera. If a request is received by the camera interface module 214 to get the index of a frame buffer associated with the single camera, the video processing offload module 216 may also send a request for an index to a frame buffer associated with the second camera. The camera interface module 214 may return the requested index and this index may be mapped to memory space accessible by the video processing offload module 216 for processing of 3D video content.

Further, if a request to de-queue an outgoing queue associated with an a single video camera is received from the 2D video messenger application 212, the video processing offload module 216 may determine whether a 3D calibration and 3D rectification of first video content and second video content received from the camera_1 110 and the camera_2 112, respectively, is completed. The video processing offload module 216 may send the first video content from the camera_1 110 to the 2D video messenger application 212 via the camera interface module 214 in response to determining that the 3D calibration and the 3D rectification of the first video content and the second video content is not completed. Alternatively, the video processing offload module 216 may send the merged 3D video content to the 2D video messenger application 212 via the camera interface module 214 in response to determining that the 3D calibration and the 3D rectification of the first video content and the second video content is completed. As such, the video processing offload module 216 may control whether the 3D video content is returned to the 2D video messenger application 212 based upon completion of calibration and rectification of video content from the two camera devices.

It should further be noted that the video content the 2D video messenger application 212 receives from the camera interface module 214 is no longer the image captured from one video camera. Instead the video content is the rectified and merged image from two connected webcams (e.g., camera_1 110 and camera_2 112) either in a side-by-side 3D format or in a top and bottom 3D format.

At a receiving device, the merged image may be post-processed to obtain the 3D visual effect. In some 3D displays, hardware for post-processing 3D video content may perform the scaling and merging of the content. Alternatively, a post-processing module (not shown) executing together with the 2D video messenger application may be implemented. The post-processing module obtains a pointer or other reference to a frame buffer of the display device. As such, a pointer to the merged image may be derived from a position of the merged image in the display screen. For the side-by-side format, the left half and right half of the image may be scaled horizontally to the full width of the image. For the top and bottom format, the upper half and lower half of the image may be scaled vertically to the full height of the image. As a result, the left view and the right view of the 3D content may be obtained, again without a change to the existing 2D video messenger application. The left view and right view may then be merged either by doing an odd line and even line interleaving or by setting up an alpha plane for frame sequential rendering of the 3D video content.

Figure 6:
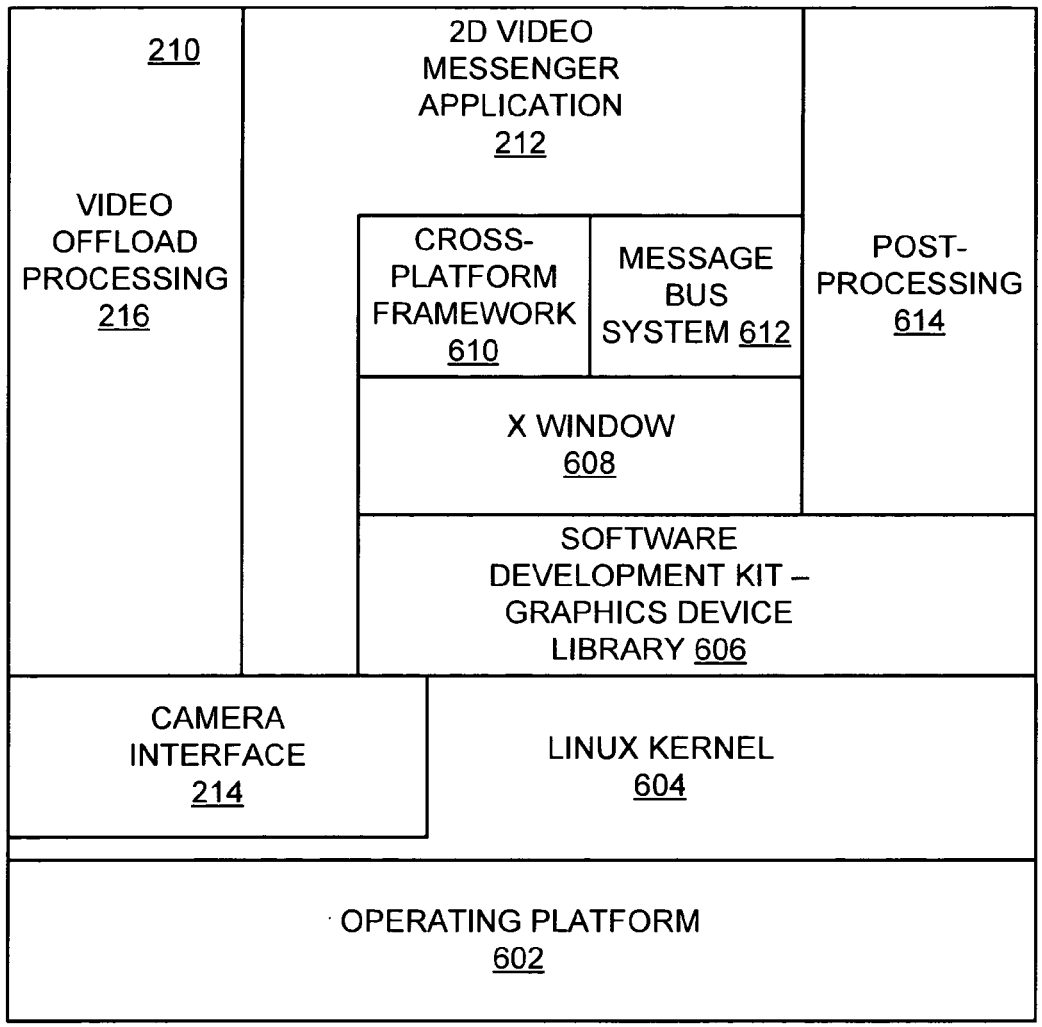
FIG. 6 is an architectural diagram of an example of an implementation of a system stack for automated 3D video for 2D video messenger applications consistent with certain embodiments of the present invention.

FIG. 6 is an architectural diagram of an example of an implementation of a system stack 600 for automated 3D video for 2D video messenger applications. An operating platform 602 may be implemented by a media processor, such as the Intel® media processor CE 3100 or other media processor. A Linux Kernel 604 provides an operating system platform on top of the operating platform 602. The camera interface module 214 is shown to be associated with the Linux Kernel 604 within a kernel layer of the system stack 600. A software development kit and graphics device library 606, such as the Intel® SDK:GDL, provides a development platform and graphics library modules. An X Window system 608, such as X11, provides a graphical user interface above the software development kit and graphics device library 606. A cross-platform application and user interface (UI) framework 610, such as QT, provides user interface class libraries for the 2D video messenger application 212. A message bus system 612, such as D-BUS, provides a messaging interface between applications distributed at client devices, such as the computing device 102 and the computing device 106. A post-processing module 614 provides the post-processing described above for 3D video content received by the 2D video messenger application 212 at such a computing device. The video processing offload module 216 and the camera interface module 214 provide the 3D video content for delivery by the 2D video messenger application 212 to such a computing device. As such, the system stack 600 provides automated 3D video for 2D video messenger applications and may be implemented on each of the computing device 102 and the computing device 106 to provide 3D video content creation by the camera interface module 214 and the video processing offload module 216, respectively. Upon receipt of 3D video content by the 2D video messenger application 212, the post-processing module 614 may determine that the video content is 3D video content and may post-process the 3D video content and render the 3D video content as described above.

FIG. 7 through FIG. 10 below describe example processes that may be executed by such devices, such as the computing device 102, to perform the automated 3D video for 2D video messenger applications associated with the present subject matter. Many other variations on the example processes are possible and all are considered within the scope of the present subject matter. The example processes may be performed by modules, such as the camera interface module 214, the video offload processing module 216, and/or executed by the processor 200, associated with such devices. It should be noted that time out procedures and other error control procedures are not illustrated within the example processes described below for ease of illustration purposes. However, it is understood that all such procedures are considered to be within the scope of the present subject matter.

Figure 7:
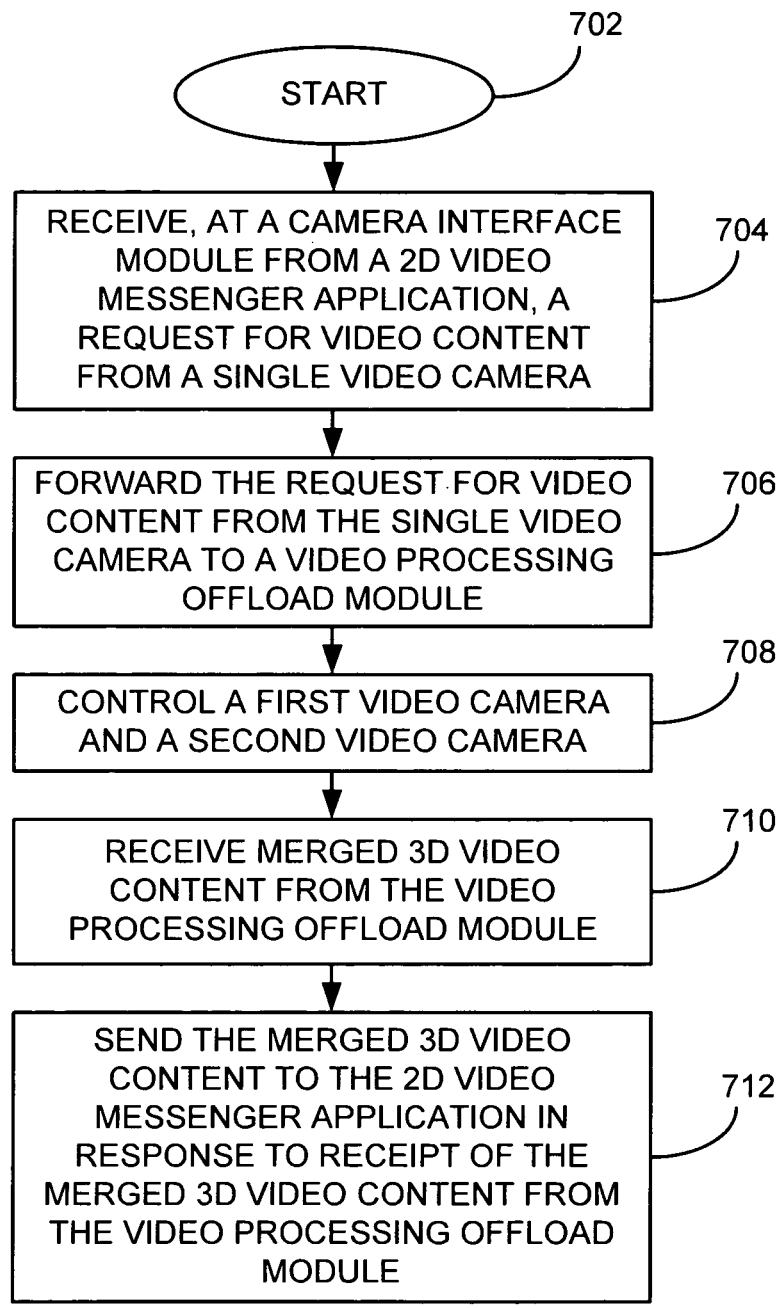
FIG. 7 is a flow chart of an example of an implementation of a process that provides automated 3D video for 2D video messenger applications at a camera interface module consistent with certain embodiments of the present invention.

FIG. 7 is a flow chart of an example of an implementation of a process 700 that provides automated 3D video for 2D video messenger applications at a camera interface module, such as the camera interface module 214. The process 700 along with the other processes described below may be executed by any client device, such as the computing device 102 and/or the computing device 106, to provide the automated 3D video for 2D video messenger applications of the present subject matter. The process 700 starts at 702. At block 704, the process 700 receives, at a camera interface module from a 2D video messenger application, a request for video content from a single video camera. At block 706, the process 700 forwards the request for video content from the single video camera to a video processing offload module. At block 708, the process 700 controls a first video camera and a second video camera. At block 710, the process 700 receives merged 3D video content from the video processing offload module. At block 712, the process 700 sends the merged 3D video content to the 2D video messenger application in response to receipt of the merged 3D video content from the video processing offload module.

Figure 8:
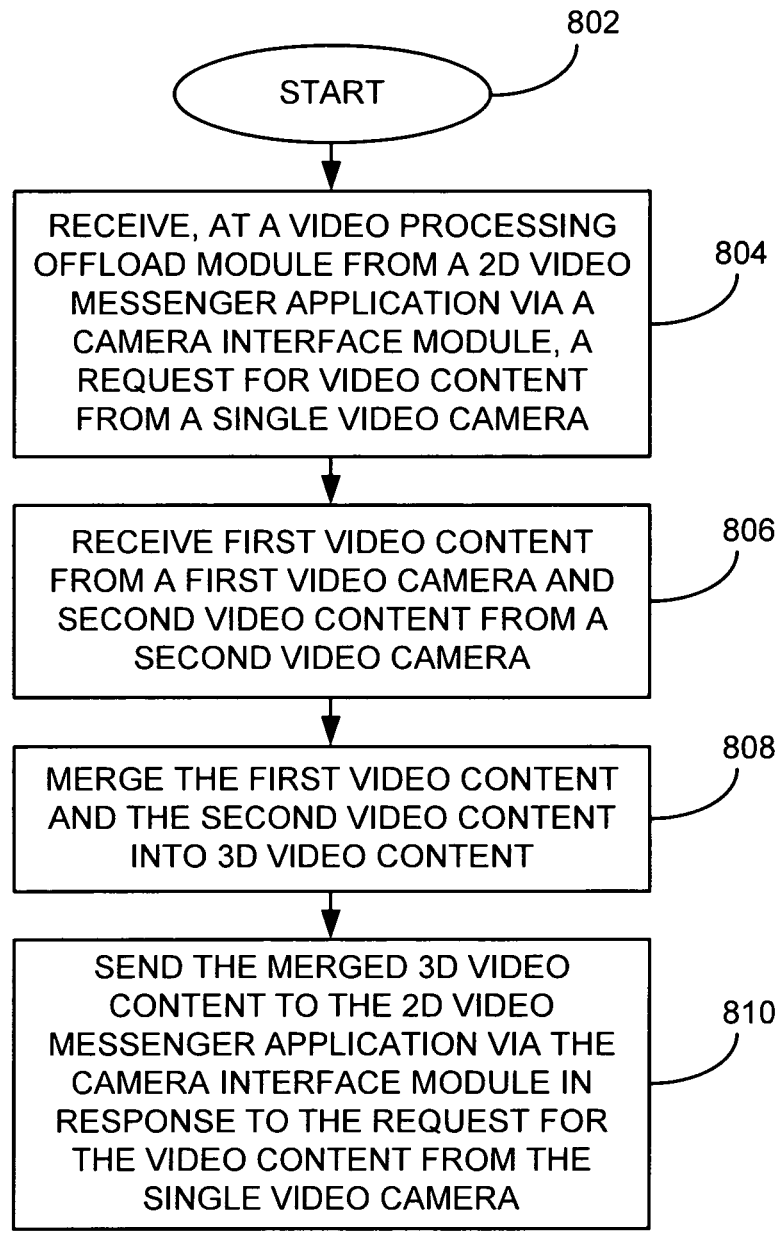
FIG. 8 is a flow chart of an example of an implementation of a process that provides automated 3D video for 2D video messenger applications at a video processing offload module consistent with certain embodiments of the present invention.

FIG. 8 is a flow chart of an example of an implementation of a process 800 that provides automated 3D video for 2D video messenger applications at a video processing offload module, such as the video offload processing module 216. The process 800 along with the other processes described below may be executed by any client device, such as the computing device 102 and/or the computing device 106, to provide the automated 3D video for 2D video messenger applications of the present subject matter. The process 800 starts at 802. At block 804, the process 800 receives, at a video processing offload module from a 2D video messenger application via a camera interface module, a request for video content from a single video camera. At block 806, the process 800 receives first video content from a first video camera and second video content from a second video camera. At block 808, the process 800 merges the first video content and the second video content into three-dimensional (3D) video content. At block 810, the process 800 sends the merged 3D video content to the 2D video messenger application via the camera interface module in response to the request for the video content from the single video camera.

Figure 9:
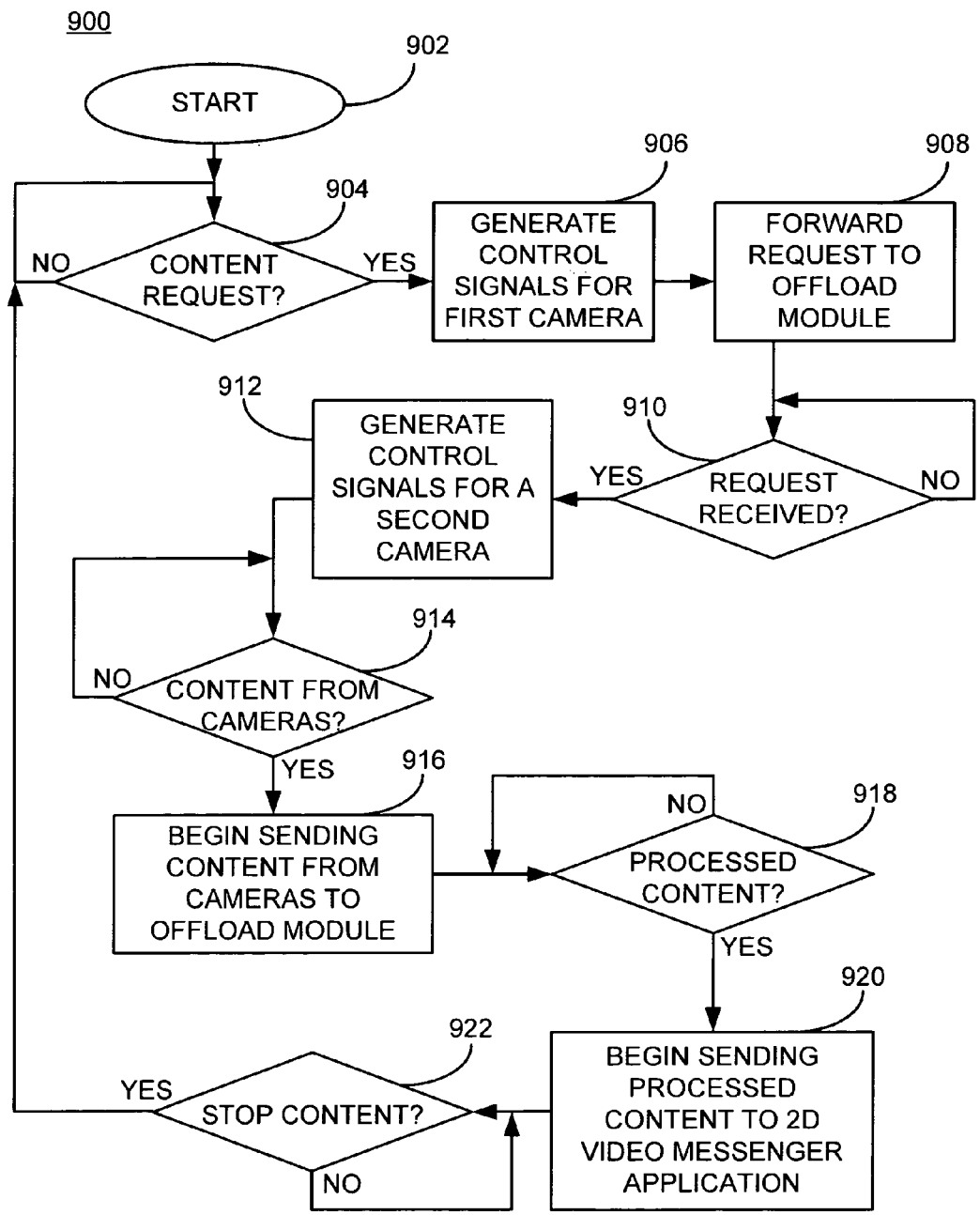
FIG. 9 is a flow chart of an example of an implementation of a process that provides automated 3D video for 2D video messenger applications at a camera interface module consistent with certain embodiments of the present invention.

FIG. 9 is a flow chart of an example of an implementation of a process 900 that provides automated 3D video for 2D video messenger applications at a camera interface module, such as the camera interface module 214. The process 900 starts at 902. At decision point 904, the process 900 makes a determination as to whether a content request associated with a single video camera has been received. As described above, a content request associated with a single video camera may be received from a 2D video messenger application, such as the 2D video messenger application 212. In response to receipt of a content request, the process 900 generates control signals for a first video camera, such as the camera1_1 110, at block 906. The process 900 forwards the request to a video processing offload module, such as the video processing offload module 216, at block 908. At decision point 910, the process 900 waits for the request to be received from the video processing offload module 216. As described above, the video processing offload module 216 may return the request to the camera interface module 214 to perform the same operation on a second video camera.

In response to receipt of the request from the video processing offload module 216, the process 900 generates control signals for a second camera, such as the camera_2 112, at block 912. At decision point 914, the process 900 makes a determination as to whether video content has been received from both cameras. In response to receipt of video content from either camera, the process 900 begins sending the content from the cameras to the video processing offload module 216 at block 916. As video content is received from the second of the two cameras, that content is also sent to the video processing offload module 216 at block 916.

At decision point 918, the process 900 makes a determination as to whether processed video content has been received from the video processing offload module 216. As described above, prior to completion of calibration, content from a single camera may be returned. Subsequent to calibration, the processed video content may be merged 3D content generated by the video processing offload module 216. The content may also be changed content, such as content changed to smooth facial features or to thin and/or stretch a video image. Many other changes to video content received from the first and second cameras are possible and all are considered within the scope of the present subject matter.

In response to receipt of the processed video content from the video processing offload module 216 at decision point 918, the process 900 begins sending the processed video content to the 2D video messenger application, such as the 2D video messenger application 212, at block 920. At decision point 922, the process 900 makes a determination as to whether to stop sending processed content to the 2D video messenger application 212. As described above, the process 900 may make a determination to stop sending processed content in response to a camera close request or other event. In response to making a determination to stop sending processed content, the process 900 returns to decision point 904 to await receipt of a new content request.

As such, the process 900 provides processing for a camera interface module, such as a camera driver module, and provides driver-level functionality for interfacing with two video cameras in response to receipt of requests associated with a single video camera from a legacy 2D video messenger application. The process 900 also communicates with a video processing offload module that performs computationally-intensive 3D and other image processing.

Figure 10:
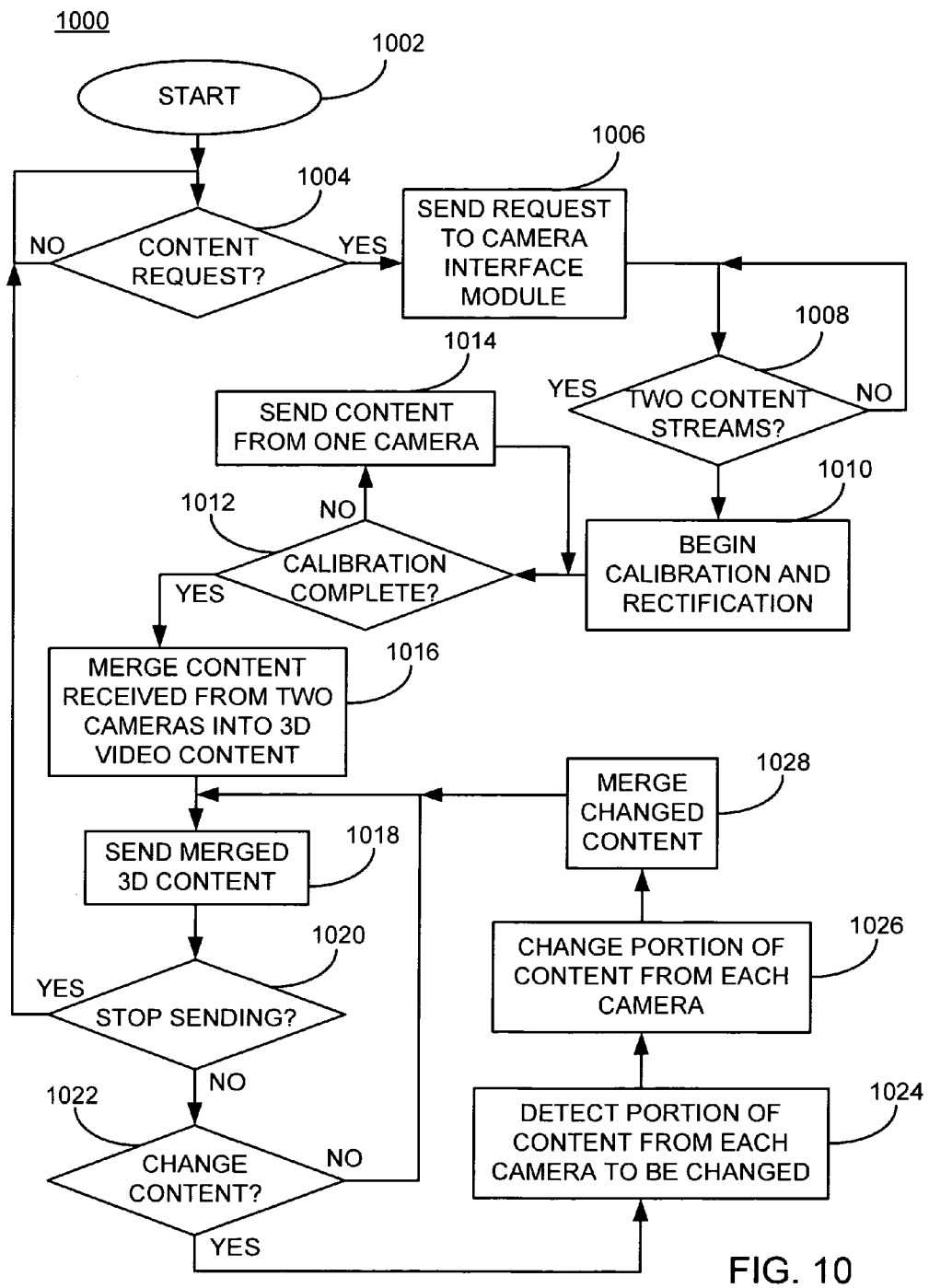
FIG. 10 is a flow chart of an example of an implementation of a process that provides automated 3D video for 2D video messenger applications at a video processing offload module consistent with certain embodiments of the present invention.

FIG. 10 is a flow chart of an example of an implementation of a process 1000 that provides automated 3D video for 2D video messenger applications at a video processing offload module, such as the video processing offload module 216. The process 1000 starts at 1002. At decision point 1004, the process 1000 waits for a content request from a camera interface module, such as the camera interface module 214. As described above, the content request may be associated with a single video camera and may be received by the video processing offload module 216 from the camera interface module 214. In response to determining that a content request has been received, the process 1000 sends the request to a camera interface module, such as the camera interface module 214, at block 1006. As described above, the camera interface module 214 may control both video cameras (e.g., the camera_1 110 and the camera_2 112). At decision point 1008, the process 1000 makes a determination as to whether two video content streams are being received.

In response to determining that two video content streams have been received, the process 1000 begins calibration and rectification activities for the two video content streams at block 1010. To achieve calibration and rectification of the video content, the process 1000 may, for example, detect an edge and a corner of an image held in front of the camera. The process 1000 may estimate a positional relationship between the first video camera and a second video camera. The process 1000 may adjust at least one of the first video content and second video content based upon the estimated positional relationship between the first video camera and the second video camera by obtaining warping matrixes to be applied to the images and applying the warping matrixes to the left and right images received from the two video cameras.

At decision point 1012, the process 1000 makes a determination as to whether the calibration and rectification activities have been completed. In response to determining that the calibration and rectification have not been completed, the process 1000 sends video content from one camera to the camera interface module 214 at block 1014. In response to determining that calibration and rectification activities have been completed at decision point 1012, the process 1000 merges the video content received from the two cameras into 3D video content at block 1016.

At block 1018, the process 1000 sends the merged 3D video content to the camera interface module 214. At decision point 1020, the process 1000 makes a determination as to whether to stop sending the merged 3D video content. As described above, the process 1000 may make a determination to stop sending processed content in response to a camera close request or other event. In response to determining that additional content is available to be merged into 3D video content and that a request to stop sending the merged 3D video content has not been received, the process 1000 makes a determination at decision point 1022 as to whether to change at least a portion of the video content. As described above, a request to change a portion of the merged 3D video content may be received from another device over a network, or may be received via a user interface associated with the computing device 102. In response to determining that a request to change at least a portion of the merged 3D video content has been received at decision point 1022, the process 1000 detects a portion of the merged 3D video content to be changed within each of the first video content received from the first video camera and the second video content received from the second video camera at block 1024.

At block 1026, the process 1000 changes the portion of the first video content and the second video content as requested. As also described above, the request to change the portion of the merged 3D video content may include, for example, a request to smooth a facial feature of an image of a person represented within the merged 3D video content. As such, the change to the portion of the video content from each camera, at block 1026, may include smoothing the facial feature of the image of the person represented within each of the first and second video content. The request to change the portion of the merged 3D video content may also include a request to thin a body image of a person represented within the merged 3D video content. As such, the change to the portion of the merged 3D video content may include thinning the body image of the person represented within each of the first and second video content. The request to change the portion of the video content may further include a request to stretch a portion of an image represented within the merged 3D video content. As such, the change to the portion of the merged 3D video content may include stretching a portion of the image represented within each of the first and second video content. Many other possibilities exist for changing video content in association with merging 3D video content and all are considered within the scope of the present subject matter.

At block 1028, the process 1000 merges the changed video content. In response to completion of merging the changed video content at block 1028, or in response to determining at decision point 1022 not to change the video content, the process 1000 returns to block 1018 and iterates as described above. Returning to the description of decision point 1020, in response to making a determination to stop sending merged 3D video content, the process 1000 returns to decision point 1004 to await a new content request.

As such, the process 1000 provides automated 3D video for 2D video messenger applications at a video processing offload module. Calibration and rectification activities are performed. Two video content streams are merged to form 3D video content and changes to the images within the merged 3D video content may be performed. The 3D video content is returned to a camera interface module and forwarded to a legacy 2D video messenger application.

It should be noted that additional sleep state and active state transitions are not illustrated in association with the process 900 and the process 1000 for ease of illustration purposes and to show processing without the sleep state and active state transitions described above. However, it is understood that the processes may be modified to include the respective sleep and active state transitions as described in association with FIG. 5 above without departure from the scope of the present subject matter. As such, while the video offload processing module 216 is waiting for the request from the camera interface module 214 (e.g., at decision point 1004 in the process 1000), it may be in the sleep state and when it receives the request, it may wake up and transition to the active state to perform the processing described. Similarly, while the camera interface module 214 is waiting for the merged 3D video content (e.g., at decision point 918 in the process 900), it may be in the sleep state and when it receives the merged 3D video content, it may wake up and transition to the active state to perform the additional processing described. Many other variations on the processing described are possible and all are considered within the scope of the present subject matter.

Thus, in accord with certain implementations, a method of providing three-dimensional (3D) video to a legacy two-dimensional (2D) video messenger application involves receiving, at a camera interface module from the 2D video messenger application, a request for video content from a single video camera; forwarding the request for video content from the single video camera to a video processing offload module; controlling a first video camera and a second video camera; receiving merged 3D video content from the video processing offload module; and sending the merged 3D video content to the 2D video messenger application in response to receipt of the merged 3D video content from the video processing offload module.

In certain implementations, the method of providing three-dimensional (3D) video to a legacy two-dimensional (2D) video messenger application further involves receiving the request for video content from the single video camera from the video processing offload module in response to forwarding the request to the video processing offload module; and where controlling the first video camera and the second video camera involves controlling the first video camera in response to receipt of the request for video content from the single video camera from the 2D video messenger application; and controlling the second video camera in response to receipt of the request for video content from the single video camera from the video processing offload module. In certain implementations, the method of controlling the first video camera and the second video camera involves generating control signals to control video output from the first video camera; and generating control signals to control video output from the second video camera. In certain implementations, the method further involves receiving first video content from the first video camera and second video content from the second video camera; sending the first video content and the second video content to the video processing offload module; and where receiving the merged 3D video content from the video processing offload module involves receiving the merged 3D video content from the video processing offload module in response to sending the first video content and the second video content to the video processing offload module. In certain implementations, the method further involves receiving a de-queue request associated with an outgoing queue of the first video camera from the 2D video messenger application; and where sending the merged 3D video content to the 2D video messenger application in response to receipt of the merged 3D video content from the video processing offload module involves copying the merged 3D video content received from the video processing offload module to the outgoing queue of the first video camera. In certain implementations, the method further involves receiving, at the camera interface module from the 2D video messenger application, a request to open the single video camera; generating control signals to open the first video camera; forwarding the request to open the single video camera to the video processing offload module; receiving the request to open the single video camera from the video processing offload module; and generating control signals to open the second video camera in response to receipt of the request to open the single video camera from the video processing offload module. In certain implementations, the method further involves receiving, at the camera interface module from the 2D video messenger application, a request to close the single video camera; generating control signals to close the first video camera; forwarding the request to close the single video camera to the video processing offload module; receiving the request to close the single video camera from the video processing offload module; and generating control signals to close the second video camera in response to receipt of the request to close the single video camera from the video processing offload module. In certain implementations, the method further involves receiving, at the camera interface module from the 2D video messenger application, a request to set a format for output associated with the single video camera; generating control signals to set the format for output associated with the single video camera to the first video camera; forwarding the request to set the format for output associated with the single video camera to the video processing offload module; receiving the request to set the format for output associated with the single video camera from the video processing offload module; and generating control signals to set the format for output associated with the second video camera to the second video camera in response to receipt of the request to set the format for output associated with the single video camera from the video processing offload module. In certain implementations, the method further involves receiving, at the camera interface module from the 2D video messenger application, a request to set an operational parameter associated with the single video camera; generating control signals to set the operational parameter associated with the first video camera; forwarding the request to set the operational parameter associated with the single video camera to the video processing offload module; receiving the request to set the operational parameter associated with the single video camera from the video processing offload module; and generating control signals to set the operational parameter associated with the second video camera in response to receipt of the request to set the operation parameter associated with the single video camera from the video processing offload module. In certain implementations, the method further involves entering, at the camera interface module, a sleep state in response to forwarding the request for video content from the single video camera to the video processing offload module; and entering, at the camera interface module, an active state in response to receiving the merged 3D video content from the video processing offload module. In certain implementations, the merged 3D video content involves one of frame sequential 3D video content and polarized 3D video content.

In another implementation, a computer readable storage medium may store instructions which, when executed on one or more programmed processors, carry out a process of providing three-dimensional (3D) video to a legacy two-dimensional (2D) video messenger application, where the processor is programmed to receive, at a camera interface module from the 2D video messenger application, a request for video content from a single video camera; forward the request for video content from the single video camera to a video processing offload module; control a first video camera and a second video camera; receive merged 3D video content from the video processing offload module; and send the merged 3D video content to the 2D video messenger application in response to receipt of the merged 3D video content from the video processing offload module.

In another implementation, the method of providing three-dimensional (3D) video to a legacy two-dimensional (2D) video messenger application involves receiving, at a video processing offload module from the 2D video messenger application via a camera interface module, a request for video content from a single video camera; receiving first video content from a first video camera and second video content from a second video camera; merging the first video content and the second video content into three-dimensional (3D) video content; and sending the merged 3D video content to the 2D video messenger application via the camera interface module in response to the request for the video content from the single video camera.

In certain implementations, the method of providing three-dimensional (3D) video to a legacy two-dimensional (2D) video messenger application further involves sending the request for video content from the single video camera to the camera interface module in response to receipt of the request for video content from the single video camera from the 2D video messenger application via the camera interface module; and where, the camera interface module controls at least one camera in response to receipt of the request for video content from the single video camera from the video processing module. In certain implementations, the method further involves performing a 3D calibration and 3D rectification of the first video content and the second video content in response to receiving the first video content from the first video camera and the second video content from the second video camera. In certain implementations, the method further involves receiving, at the video processing offload module, a de-queue request originated by the 2D video messenger application associated with an outgoing queue of the first video camera via the camera interface module; determining whether the 3D calibration and the 3D rectification of the first video content and the second video content is completed; sending the first video content from the first video camera to the 2D video messenger application via the camera interface module in response to determining that the 3D calibration and the 3D rectification of the first video content and the second video content is not completed; and sending the merged 3D video content to the 2D video messenger application via the camera interface module in response to determining that the 3D calibration and the 3D rectification of the first video content and the second video content is completed. In certain implementations, the method further involves receiving, at the video processing offload module from the 2D video messenger application via the camera interface module, a request to open the single video camera; and sending a request to open the second video camera to the camera interface module. In certain implementations, the method further involves receiving, at the video processing offload module from the 2D video messenger application via the camera interface module, a request to close the single video camera; and sending a request to close the second video camera to the camera interface module. In certain implementations, the method further involves receiving, at the video processing offload module from the 2D video messenger application via the camera interface module, a request to set a format for output associated with the single video camera; and sending a request to set a format for output associated with the second video camera to the camera interface module. In certain implementations, the method further involves receiving, at the video processing offload module from the 2D video messenger application via the camera interface module, a request to set an operational parameter associated with the single video camera; and sending a request to set an operational parameter associated with the second video camera to the camera interface module. In certain implementations, the method further involves receiving, at the video processing offload module from the 2D video messenger application via the camera interface module, a request to allocate a number of frame buffers for the single video camera; and sending a request to allocate the same number of frame buffers for the second video camera to the camera interface module. In certain implementations, the method further involves sending a request for an index to a frame buffer associated with each of the first video camera and the second video camera to the camera interface module; receiving the index to the frame buffer associated with the first video camera and the index to the frame buffer associated with the second video camera from the camera interface module; and mapping the index to the frame buffer associated with the first video camera and the index to the frame buffer associated with the second video camera to a memory associated with the video processing offload module. In certain implementations, the method further involves entering, at the video processing offload module, an active state in response to receiving, from the 2D video messenger application, the request for video content from the single video camera; and entering, at the video processing offload module, a sleep state in response to starting sending the merged 3D video content to the 2D video messenger application via the camera interface module. In certain implementations, the method further involves receiving a request to perform a 3D calibration of the first video content received from the first video camera and the second video content received from the second video camera; and performing the 3D calibration of the first video content received from the first video camera and the second video content received from the second video camera. In certain implementations, the method of performing the 3D calibration of the first video content received from the first video camera and the second video content received from the second video camera involves estimating a positional relationship between the first video camera and the second video camera; and rectifying the first video content and the second video content. In certain implementations, the method rectifying the first video content and the second video content involves obtaining warping matrixes; and applying the warping matrixes to the first video content and the second video content. In certain implementations, the method of performing the 3D calibration of the first video content received from the first video camera and the second video content received from the second video camera involves detecting at least one of an edge and a corner of an image; estimating a positional relationship between the first video camera and the second video camera; and adjusting at least one of the first video content and the second video content based upon the estimated positional relationship between the first video camera and the second video camera. In certain implementations, the method of merging the first video content and the second video content into the 3D video content involves forming the 3D video content as one of side-by-side 3D video content, top-and-bottom 3D video content, and frame sequential 3D video content. In certain implementations, the method further involves receiving a request to change a portion of the merged 3D video content; detecting the portion of the merged 3D video content within each of the first video content received from the first video camera and the second video content received from the second video camera; and changing a portion of the first video content received from the first video camera and a portion of the second video content received from the second video camera. In certain implementations, the request to change the portion of the merged 3D video content involves a request to smooth a facial feature of an image of a person represented within the merged 3D video content; and the method of changing the portion of the first video content received from the first video camera and the portion of the second video content received from the second video camera involves smoothing the facial feature of the image of the person represented in the first video content received from the first video camera; and smoothing the facial feature of the image of the person represented in the second video content received from the second video camera. In certain implementations, the request to change the portion of the merged 3D video content involves a request to thin a body image of a person represented within the merged 3D video content; and the method of changing the portion of the first video content received from the first video camera and the portion of the second video content received from the second video camera involves thinning the body image of the person represented in the first video content received from the first video camera; and thinning the body image of the person represented in the second video content received from the second video camera. In certain implementations, the request to change the portion of the merged 3D video content involves a request to stretch a portion of an image represented within the merged 3D video content; and the method of changing the portion of the first video content received from the first video camera and the portion of the second video content received from the second video camera involves stretching the portion of the image represented in the first video content received from the first video camera; and stretching the portion of the image represented in the second video content received from the second video camera.

In another implementation, a computer readable storage medium may store instructions which, when executed on one or more programmed processors, carry out a process of providing three-dimensional (3D) video to a legacy two-dimensional (2D) video messenger application, where the processor is programmed to receive, at a video processing offload module from the 2D video messenger application via a camera interface module, a request for video content from a single video camera; receive first video content from a first video camera and second video content from a second video camera; merge the first video content and the second video content into three-dimensional (3D) video content; and send the merged 3D video content to the 2D video messenger application via the camera interface module in response to the request for the video content from the single video camera.

An apparatus for providing three-dimensional (3D) video to a legacy two-dimensional (2D) video messenger application consistent with another implementation has a first video camera; a second video camera; and a processor programmed to receive, from the 2D video messenger application, a request for video content from a single video camera; forward the request for video content from the single video camera to a video processing offload module; control a first video camera and a second video camera; receive merged 3D video content from the video processing offload module; and send the merged 3D video content to the 2D video messenger application in response to receipt of the merged 3D video content from the video processing offload module.

In certain implementations, the apparatus for providing three-dimensional (3D) video to a legacy two-dimensional (2D) video messenger application has a processor that is further programmed to receive the request for video content from the single video camera from the video processing offload module in response to forwarding the request to the video processing offload module; and where, in being programmed to control the first video camera and the second video camera, the processor is programmed to control the first video camera in response to receipt of the request for video content from the single video camera from the 2D video messenger application; and control the second video camera in response to receipt of the request for video content from the single video camera from the video processing offload module. In certain implementations, in being programmed to control the first video camera and the second video camera, the processor is programmed to generate control signals to control video output from the first video camera; and generate control signals to control video output from the second video. In certain implementations, the processor is further programmed to receive first video content from the first video camera and second video content from the second video camera; send the first video content and the second video content to the video processing offload module; and where, in being programmed to receive the merged 3D video content from the video processing offload module, the processor is programmed to receive the merged 3D video content from the video processing offload module in response to sending the first video content and the second video content to the video processing offload module. In certain implementations, the processor is further programmed to receive a de-queue request associated with an outgoing queue of the first video camera from the 2D video messenger application; and where, in being programmed to send the merged 3D video content to the 2D video messenger application in response to receipt of the merged 3D video content from the video processing offload module, the processor is programmed to copy the merged 3D video content received from the video processing offload module to the outgoing queue of the first video camera. In certain implementations, the processor is further programmed to receive, from the 2D video messenger application, a request to open the single video camera; generate control signals to open the first video camera; forward the request to open the single video camera to the video processing offload module; receive the request to open the single video camera from the video processing offload module; and generate control signals to open the second video camera in response to receipt of the request to open the single video camera from the video processing offload module. In certain implementations, the processor is further programmed to receive, from the 2D video messenger application, a request to close the single video camera; generate control signals to close the first video camera; forward the request to close the single video camera to the video processing offload module; receive the request to close the single video camera from the video processing offload module; and generate control signals to close the second video camera in response to receipt of the request to close the single video camera from the video processing offload module. In certain implementations, the processor is further programmed to receive, from the 2D video messenger application, a request to set a format for output associated with the single video camera; generate control signals to set the format for output associated with the single video camera to the first video camera; forward the request to set the format for output associated with the single video camera to the video processing offload module; receive the request to set the format for output associated with the single video camera from the video processing offload module; and generate control signals to set the format for output associated with the second video camera to the second video camera in response to receipt of the request to set the format for output associated with the single video camera from the video processing offload module. In certain implementations, the processor is further programmed to receive, from the 2D video messenger application, a request to set an operational parameter associated with the single video camera; generate control signals to set the operational parameter associated with the first video camera; forward the request to set the operational parameter associated with the single video camera to the video processing offload module; receive the request to set the operational parameter associated with the single video camera from the video processing offload module; and generate control signals to set the operational parameter associated with the second video camera in response to receipt of the request to set the operation parameter associated with the single video camera from the video processing offload module. In certain implementations, the processor is further programmed to enter a sleep state in response to forwarding the request for video content from the single video camera to the video processing offload module; and enter an active state in response to receiving the merged 3D video content from the video processing offload module. In certain implementations, the merged 3D video content involves one of frame sequential 3D video content and polarized 3D video content.

An apparatus for providing three-dimensional (3D) video to a legacy two-dimensional (2D) video messenger application consistent with another implementation has a first video camera; a second video camera; and a processor programmed to receive, from the 2D video messenger application via a camera interface module, a request for video content from a single video camera; receive first video content from a first video camera and second video content from a second video camera; merge the first video content and the second video content into three-dimensional (3D) video content; and send the merged 3D video content to the 2D video messenger application via the camera interface module in response to the request for the video content from the single video camera.

In certain implementations, the apparatus for providing three-dimensional (3D) video to a legacy two-dimensional (2D) video messenger application has a processor that is further programmed to send the request for video content from the single video camera to the camera interface module in response to receipt of the request for video content from the single video camera from the 2D video messenger application via the camera interface module; and where, the camera interface module controls at least one camera in response to receipt of the request for video content from the single video camera from the video processing module. In certain implementations, the processor is further programmed to perform a 3D calibration and 3D rectification of the first video content and the second video content in response to receiving the first video content from the first video camera and the second video content from the second video camera. In certain implementations, the processor is further programmed to receive a de-queue request originated by the 2D video messenger application associated with an outgoing queue of the first video camera via the camera interface module; determine whether the 3D calibration and the 3D rectification of the first video content and the second video content is completed; send the first video content from the first video camera to the 2D video messenger application via the camera interface module in response to determining that the 3D calibration and the 3D rectification of the first video content and the second video content is not completed; and send the merged 3D video content to the 2D video messenger application via the camera interface module in response to determining that the 3D calibration and the 3D rectification of the first video content and the second video content is completed. In certain implementations, the processor is further programmed to receive, from the 2D video messenger application via the camera interface module, a request to open the single video camera; and send a request to open the second video camera to the camera interface module. In certain implementations, the processor is further programmed to receive, from the 2D video messenger application via the camera interface module, a request to close the single video camera; and send a request to close the second video camera to the camera interface module. In certain implementations, the processor is further programmed to receive, from the 2D video messenger application via the camera interface module, a request to set a format for output associated with the single video camera; and send a request to set a format for output associated with the second video camera to the camera interface module. In certain implementations, the processor is further programmed to receive, from the 2D video messenger application via the camera interface module, a request to set an operational parameter associated with the single video camera; and send a request to set an operational parameter associated with the second video camera to the camera interface module. In certain implementations, the processor is further programmed to receive, from the 2D video messenger application via the camera interface module, a request to allocate a number of frame buffers for the single video camera; and send a request to allocate the same number of frame buffers for the second video camera to the camera interface module. In certain implementations, the apparatus has a memory; and the processor is further programmed to send a request for an index to a frame buffer associated with each of the first video camera and the second video camera to the camera interface module; receive the index to the frame buffer associated with the first video camera and the index to the frame buffer associated with the second video camera from the camera interface module; and map the index to the frame buffer associated with the first video camera and the index to the frame buffer associated with the second video camera to the memory. In certain implementations, the processor is further programmed to enter an active state in response to receiving, from the 2D video messenger application, the request for video content from the single video camera; and enter a sleep state in response to starting sending the merged 3D video content to the 2D video messenger application via the camera interface module. In certain implementations, the processor is further programmed to receive a request to perform a 3D calibration of the first video content received from the first video camera and the second video content received from the second video camera; and perform the 3D calibration of the first video content received from the first video camera and the second video content received from the second video camera. In certain implementations, in being programmed to perform the 3D calibration of the first video content received from the first video camera and the second video content received from the second video camera, the processor is programmed to estimate a positional relationship between the first video camera and the second video camera; and rectify the first video content and the second video content. In certain implementations, in being programmed to rectify the first video content and the second video content, the processor is programmed to obtain warping matrixes; and apply the warping matrixes to the first video content and the second video content. In certain implementations, in being programmed to perform the 3D calibration of the first video content received from the first video camera and the second video content received from the second video camera, the processor is programmed to detect at least one of an edge and a corner of an image; estimate a positional relationship between the first video camera and the second video camera; and adjust at least one of the first video content and the second video content based upon the estimated positional relationship between the first video camera and the second video camera. In certain implementations, in being programmed to merge the first video content and the second video content into the 3D video content, the processor is programmed to form the 3D video content as one of side-by-side 3D video content, top-and-bottom 3D video content, and frame sequential 3D video content. In certain implementations, the processor is further programmed to receive a request to change a portion of the merged 3D video content; detect the portion of the merged 3D video content within each of the first video content received from the first video camera and the second video content received from the second video camera; and change a portion of the first video content received from the first video camera and a portion of the second video content received from the second video camera. In certain implementations, the request to change the portion of the merged 3D video content involves a request to smooth a facial feature of an image of a person represented within the merged 3D video content; and in being programmed to change the portion of the first video content received from the first video camera and the portion of the second video content received from the second video camera, the processor is programmed to smooth the facial feature of the image of the person represented in the first video content received from the first video camera; and smooth the facial feature of the image of the person represented in the second video content received from the second video camera. In certain implementations, the request to change the portion of the merged 3D video content involves a request to thin a body image of a person represented within the merged 3D video content; and in being programmed to change the portion of the first video content received from the first video camera and the portion of the second video content received from the second video camera, the processor is programmed to thin the body image of the person represented in the first video content received from the first video camera; and thin the body image of the person represented in the second video content received from the second video camera. In certain implementations, the request to change the portion of the merged 3D video content involves a request to stretch a portion of an image represented within the merged 3D video content; and in being programmed to change the portion of the first video content received from the first video camera and the portion of the second video content received from the second video camera, the processor is programmed to stretch the portion of the image represented in the first video content received from the first video camera; and stretch the portion of the image represented in the second video content received from the second video camera.

While certain embodiments herein were described in conjunction with specific circuitry that carries out the functions described, other embodiments are contemplated in which the circuit functions are carried out using equivalent elements executed on one or more programmed processors. General purpose computers, microprocessor based computers, microcontrollers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of providing three-dimensional (3D) video to a legacy two-dimensional (2D) video messenger application, comprising:
    receiving, at a camera interface module from the 2D video messenger application, a request for video content from a single video camera;
    forwarding the request for video content from the single video camera to a video processing offload module;
    at the camera interface module, controlling a first video camera and a second video camera;
    receiving merged 3D video content from the video processing offload module; and
    sending the merged 3D video content to the 2D video messenger application in response to receipt of the merged 3D video content from the video processing offload module.

2. The method according to claim 1, further comprising:
    receiving the request for video content from the single video camera from the video processing offload module in response to forwarding the request to the video processing offload module; and
    where controlling the first video camera and the second video camera comprises:
        controlling the first video camera in response to receipt of the request for video content from the single video camera from the 2D video messenger application; and
        controlling the second video camera in response to receipt of the request for video content from the single video camera from the video processing offload module.

3. The method according to claim 1, where controlling the first video camera and the second video camera comprises:
    generating control signals to control video output from the first video camera; and
    generating control signals to control video output from the second video camera.

4. The method according to claim 1, further comprising:
    receiving first video content from the first video camera and second video content from the second video camera;
    sending the first video content and the second video content to the video processing offload module; and
    where receiving the merged 3D video content from the video processing offload module comprises receiving the merged 3D video content from the video processing offload module in response to sending the first video content and the second video content to the video processing offload module.

5. The method according to claim 1, further comprising:
    receiving a de-queue request associated with an outgoing queue of the first video camera from the 2D video messenger application; and
    where sending the merged 3D video content to the 2D video messenger application in response to receipt of the merged 3D video content from the video processing offload module comprises copying the merged 3D video content received from the video processing offload module to the outgoing queue of the first video camera.

6. The method according to claim 1, further comprising:
receiving, at the camera interface module from the 2D video messenger application, a request to open the single video camera;
generating control signals to open the first video camera;
forwarding the request to open the single video camera to the video processing offload module;
receiving the request to open the single video camera from the video processing offload module; and
generating control signals to open the second video camera in response to receipt of the request to open the single video camera from the video processing offload module.

7. The method according to claim 1, further comprising:
receiving, at the camera interface module from the 2D video messenger application, a request to close the single video camera;
generating control signals to close the first video camera;
forwarding the request to close the single video camera to the video processing offload module;
receiving the request to close the single video camera from the video processing offload module; and
generating control signals to close the second video camera in response to receipt of the request to close the single video camera from the video processing offload module.

8. The method according to claim 1, further comprising:
receiving, at the camera interface module from the 2D video messenger application, a request to set a format for output associated with the single video camera;
generating control signals to set the format for output associated with the single video camera to the first video camera;
forwarding the request to set the format for output associated with the single video camera to the video processing offload module;
receiving the request to set the format for output associated with the single video camera from the video processing offload module; and
generating control signals to set the format for output associated with the second video camera to the second video camera in response to receipt of the request to set the format for output associated with the single video camera from the video processing offload module.

9. The method according to claim 1, further comprising:
receiving, at the camera interface module from the 2D video messenger application, a request to set an operational parameter associated with the single video camera;
generating control signals to set the operational parameter associated with the first video camera;
forwarding the request to set the operational parameter associated with the single video camera to the video processing offload module;
receiving the request to set the operational parameter associated with the single video camera from the video processing offload module; and
generating control signals to set the operational parameter associated with the second video camera in response to receipt of the request to set the operation parameter associated with the single video camera from the video processing offload module.

10. The method according to claim 1, further comprising:
entering, at the camera interface module, a sleep state in response to forwarding the request for video content from the single video camera to the video processing offload module; and
entering, at the camera interface module, an active state in response to receiving the merged 3D video content from the video processing offload module.

11. The method according to claim 1, where the merged 3D video content comprises one of frame sequential 3D video content and polarized 3D video content.

12. A non-transitory computer readable storage medium storing instructions which, when executed on one or more programmed processors, carry out the method according to claim 1.

13. A method of providing three-dimensional (3D) video to a legacy two-dimensional (2D) video messenger application, comprising:
receiving, at a video processing offload module from the 2D video messenger application via a camera interface module, a request for video content from a single video camera;
receiving first video content from a first video camera and second video content from a second video camera;
merging the first video content and the second video content into three-dimensional (3D) video content; and
sending the merged 3D video content to the 2D video messenger application via the camera interface module in response to the request for the video content from the single video camera.

14. The method according to claim 13, further comprising:
sending the request for video content from the single video camera to the camera interface module in response to receipt of the request for video content from the single video camera from the 2D video messenger application via the camera interface module; and
where the camera interface module controls at least one camera in response to receipt of the request for video content from the single video camera from the video processing module.

15. The method according to claim 13, further comprising performing a 3D calibration and 3D rectification of the first video content and the second video content in response to receiving the first video content from the first video camera and the second video content from the second video camera.

16. The method according to claim 15, further comprising:
receiving, at the video processing offload module, a de-queue request originated by the 2D video messenger application associated with an outgoing queue of the first video camera via the camera interface module;
determining whether the 3D calibration and the 3D rectification of the first video content and the second video content is completed;
sending the first video content from the first video camera to the 2D video messenger application via the camera interface module in response to determining that the 3D calibration and the 3D rectification of the first video content and the second video content is not completed; and
sending the merged 3D video content to the 2D video messenger application via the camera interface module in response to determining that the 3D calibration and the 3D rectification of the first video content and the second video content is completed.

17. The method according to claim 13, further comprising:
receiving, at the video processing offload module from the 2D video messenger application via the camera interface module, a request to open the single video camera; and
sending a request to open the second video camera to the camera interface module.

18. The method according to claim 13, further comprising:
receiving, at the video processing offload module from the 2D video messenger application via the camera interface module, a request to close the single video camera; and
sending a request to close the second video camera to the camera interface module.

19. The method according to claim 13, further comprising:
receiving, at the video processing offload module from the 2D video messenger application via the camera interface module, a request to set a format for output associated with the single video camera; and
sending a request to set a format for output associated with the second video camera to the camera interface module.

20. The method according to claim 13, further comprising:
receiving, at the video processing offload module from the 2D video messenger application via the camera interface module, a request to set an operational parameter associated with the single video camera; and
sending a request to set an operational parameter associated with the second video camera to the camera interface module.

21. The method according to claim 13, further comprising:
receiving, at the video processing offload module from the 2D video messenger application via the camera interface module, a request to allocate a number of frame buffers for the single video camera; and
sending a request to allocate the same number of frame buffers for the second video camera to the camera interface module.

22. The method according to claim 13, further comprising:
sending a request for an index to a frame buffer associated with each of the first video camera and the second video camera to the camera interface module;
receiving the index to the frame buffer associated with the first video camera and the index to the frame buffer associated with the second video camera from the camera interface module; and
mapping the index to the frame buffer associated with the first video camera and the index to the frame buffer associated with the second video camera to a memory associated with the video processing offload module.

23. The method according to claim 13, further comprising:
entering, at the video processing offload module, an active state in response to receiving, from the 2D video messenger application, the request for video content from the single video camera; and
entering, at the video processing offload module, a sleep state in response to starting sending the merged 3D video content to the 2D video messenger application via the camera interface module.

24. The method according to claim 13, further comprising:
receiving a request to perform a 3D calibration of the first video content received from the first video camera and the second video content received from the second video camera; and
performing the 3D calibration of the first video content received from the first video camera and the second video content received from the second video camera.

25. The method according to claim 24, where performing the 3D calibration of the first video content received from the first video camera and the second video content received from the second video camera comprises:
estimating a positional relationship between the first video camera and the second video camera; and
rectifying the first video content and the second video content.

26. The method according to claim 25, where rectifying the first video content and the second video content comprises:
obtaining warping matrixes; and
applying the warping matrixes to the first video content and the second video content.

27. The method according to claim 24, where performing the 3D calibration of the first video content received from the first video camera and the second video content received from the second video camera comprises:
detecting at least one of an edge and a corner of an image;
estimating a positional relationship between the first video camera and the second video camera; and
adjusting at least one of the first video content and the second video content based upon the estimated positional relationship between the first video camera and the second video camera.

28. The method according to claim 13, where merging the first video content and the second video content into the 3D video content comprises forming the 3D video content as one of side-by-side 3D video content, top-and-bottom 3D video content, and frame sequential 3D video content.

29. The method according to claim 13, further comprising:
receiving a request to change a portion of the merged 3D video content;
detecting the portion of the merged 3D video content within each of the first video content received from the first video camera and the second video content received from the second video camera; and
changing a portion of the first video content received from the first video camera and a portion of the second video content received from the second video camera.

30. The method according to claim 29, where:
the request to change the portion of the merged 3D video content comprises a request to smooth a facial feature of an image of a person represented within the merged 3D video content; and
changing the portion of the first video content received from the first video camera and the portion of the second video content received from the second video camera comprises:
smoothing the facial feature of the image of the person represented in the first video content received from the first video camera; and
smoothing the facial feature of the image of the person represented in the second video content received from the second video camera.

31. The method according to claim 29, where:
the request to change the portion of the merged 3D video content comprises a request to thin a body image of a person represented within the merged 3D video content; and
changing the portion of the first video content received from the first video camera and the portion of the second video content received from the second video camera comprises:
thinning the body image of the person represented in the first video content received from the first video camera; and
thinning the body image of the person represented in the second video content received from the second video camera.

32. The method according to claim 29, where:
the request to change the portion of the merged 3D video content comprises a request to stretch a portion of an image represented within the merged 3D video content; and changing the portion of the first video content received from the first video camera and the portion of the second video content received from the second video camera comprises:
  stretching the portion of the image represented in the first video content received from the first video camera; and
  stretching the portion of the image represented in the second video content received from the second video camera.

33. A non-transitory computer readable storage medium storing instructions which, when executed on one or more programmed processors, carry out the method according to claim 13.

34. An apparatus that provides three-dimensional (3D) video to a legacy two-dimensional (2D) video messenger application comprising:
  a first video camera;
  a second video camera; and
  a processor programmed to:
    receive, from the 2D video messenger application, a request for video content from a single video camera;
    forward the request for video content from the single video camera to a video processing offload module;
    control a first video camera and a second video camera responsive to the request for video content from the single video camera;
    receive merged 3D video content from the video processing offload module; and
    send the merged 3D video content to the 2D video messenger application in response to receipt of the merged 3D video content from the video processing offload module.

35. The apparatus according to claim 34, where the processor is further programmed to:
  receive the request for video content from the single video camera from the video processing offload module in response to forwarding the request to the video processing offload module; and
  where, in being programmed to control the first video camera and the second video camera, the processor is programmed to:
    control the first video camera in response to receipt of the request for video content from the single video camera from the 2D video messenger application; and
    control the second video camera in response to receipt of the request for video content from the single video camera from the video processing offload module.

36. The apparatus according to claim 34, where, in being programmed to control the first video camera and the second video camera, the processor is programmed to:
  generate control signals to control video output from the first video camera; and
  generate control signals to control video output from the second video.

37. The apparatus according to claim 34, where the processor is further programmed to:
  receive first video content from the first video camera and second video content from the second video camera;
  send the first video content and the second video content to the video processing offload module; and
  where, in being programmed to receive the merged 3D video content from the video processing offload module, the processor is programmed to receive the merged 3D video content from the video processing offload module in response to sending the first video content and the second video content to the video processing offload module.

38. The apparatus according to claim 34, where the processor is further programmed to:
  receive a de-queue request associated with an outgoing queue of the first video camera from the 2D video messenger application; and
  where, in being programmed to send the merged 3D video content to the 2D video messenger application in response to receipt of the merged 3D video content from the video processing offload module, the processor is programmed to copy the merged 3D video content received from the video processing offload module to the outgoing queue of the first video camera.

39. The apparatus according to claim 34, where the processor is further programmed to:
  receive, from the 2D video messenger application, a request to open the single video camera;
  generate control signals to open the first video camera;
  forward the request to open the single video camera to the video processing offload module;
  receive the request to open the single video camera from the video processing offload module; and
  generate control signals to open the second video camera in response to receipt of the request to open the single video camera from the video processing offload module.

40. The apparatus according to claim 34, where the processor is further programmed to:
  receive, from the 2D video messenger application, a request to close the single video camera;
  generate control signals to close the first video camera;
  forward the request to close the single video camera to the video processing offload module;
  receive the request to close the single video camera from the video processing offload module; and
  generate control signals to close the second video camera in response to receipt of the request to close the single video camera from the video processing offload module.

41. The apparatus according to claim 34, where the processor is further programmed to:
  receive, from the 2D video messenger application, a request to set a format for output associated with the single video camera;
  generate control signals to set the format for output associated with the single video camera to the first video camera;
  forward the request to set the format for output associated with the single video camera to the video processing offload module;
  receive the request to set the format for output associated with the single video camera from the video processing offload module; and
  generate control signals to set the format for output associated with the second video camera to the second video camera in response to receipt of the request to set the format for output associated with the single video camera from the video processing offload module.

42. The apparatus according to claim 34, where the processor is further programmed to:
  receive, from the 2D video messenger application, a request to set an operational parameter associated with the single video camera;
  generate control signals to set the operational parameter associated with the first video camera;

forward the request to set the operational parameter associated with the single video camera to the video processing offload module;

receive the request to set the operational parameter associated with the single video camera from the video processing offload module; and generate control signals to set the operational parameter associated with the second video camera in response to receipt of the request to set the operation parameter associated with the single video camera from the video processing offload module.

43. The apparatus according to claim 34, where the processor is further programmed to:

enter a sleep state in response to forwarding the request for video content from the single video camera to the video processing offload module; and enter an active state in response to receiving the merged 3D video content from the video processing offload module.

44. The apparatus according to claim 43, where the processor is further programmed to:

receive a de-queue request originated by the 2D video messenger application associated with an outgoing queue of the first video camera via the camera interface module;

determine whether the 3D calibration and the 3D rectification of the first video content and the second video content is completed;

send the first video content from the first video camera to the 2D video messenger application via the camera interface module in response to determining that the 3D calibration and the 3D rectification of the first video content and the second video content is not completed; and send the merged 3D video content to the 2D video messenger application via the camera interface module in response to determining that the 3D calibration and the 3D rectification of the first video content and the second video content is completed.

45. The apparatus according to claim 34, where the merged 3D video content comprises one of frame sequential 3D video content and polarized 3D video content.

46. An apparatus that provides three-dimensional (3D) video to a legacy two-dimensional (2D) video messenger application comprising:

a first video camera;
a second video camera; and
a processor programmed to:
receive, from the 2D video messenger application via a camera interface module, a request for video content from a single video camera;
receive first video content from a first video camera and second video content from a second video camera responsive to the request for video content from the single video camera;
merge the first video content and the second video content into three-dimensional (3D) video content; and
send the merged 3D video content to the 2D video messenger application via the camera interface module in response to the request for the video content from the single video camera.

47. The apparatus according to claim 46, where the processor is further programmed to:

send the request for video content from the single video camera to the camera interface module in response to receipt of the request for video content from the single video camera from the 2D video messenger application via the camera interface module; and where, the camera interface module controls at least one camera in response to receipt of the request for video content from the single video camera from the video processing module.

48. The apparatus according to claim 46, where the processor is further programmed to perform a 3D calibration and 3D rectification of the first video content and the second video content in response to receiving the first video content from the first video camera and the second video content from the second video camera.

49. The apparatus according to claim 46, where the processor is further programmed to:

receive, from the 2D video messenger application via the camera interface module, a request to open the single video camera; and send a request to open the second video camera to the camera interface module.

50. The apparatus according to claim 46, where the processor is further programmed to:

receive, from the 2D video messenger application via the camera interface module, a request to close the single video camera; and send a request to close the second video camera to the camera interface module.

51. The apparatus according to claim 46, where the processor is further programmed to:

receive, from the 2D video messenger application via the camera interface module, a request to set a format for output associated with the single video camera; and send a request to set a format for output associated with the second video camera to the camera interface module.

52. The apparatus according to claim 46, where the processor is further programmed to:

receive, from the 2D video messenger application via the camera interface module, a request to set an operational parameter associated with the single video camera; and send a request to set an operational parameter associated with the second video camera to the camera interface module.

53. The apparatus according to claim 46, where the processor is further programmed to:

receive, from the 2D video messenger application via the camera interface module, a request to allocate a number of frame buffers for the single video camera; and send a request to allocate the same number of frame buffers for the second video camera to the camera interface module.

54. The apparatus according to claim 46, further comprising:

a memory; and
where the processor is further programmed to:
send a request for an index to a frame buffer associated with each of the first video camera and the second video camera to the camera interface module;
receive the index to the frame buffer associated with the first video camera and the index to the frame buffer associated with the second video camera from the camera interface module ; and
map the index to the frame buffer associated with the first video camera and the index to the frame buffer associated with the second video camera to the memory.

55. The apparatus according to claim 46, where the processor is further programmed to:

enter an active state in response to receiving, from the 2D video messenger application, the request for video content from the single video camera; and enter a sleep state in response to starting sending the merged 3D video content to the 2D video messenger application via the camera interface module.

56. The apparatus according to claim 46, where the processor is further programmed to:
receive a request to perform a 3D calibration of the first video content received from the first video camera and the second video content received from the second video camera; and
perform the 3D calibration of the first video content received from the first video camera and the second video content received from the second video camera.

57. The apparatus according to claim 56, where, in being programmed to perform the 3D calibration of the first video content received from the first video camera and the second video content received from the second video camera, the processor is programmed to:
estimate a positional relationship between the first video camera and the second video camera; and
rectify the first video content and the second video content.

58. The apparatus according to claim 57, where, in being programmed to rectify the first video content and the second video content, the processor is programmed to:
obtain warping matrixes; and
apply the warping matrixes to the first video content and the second video content.

59. The apparatus according to claim 56, where, in being programmed to perform the 3D calibration of the first video content received from the first video camera and the second video content received from the second video camera, the processor is programmed to:
detect at least one of an edge and a corner of an image;
estimate a positional relationship between the first video camera and the second video camera; and
adjust at least one of the first video content and the second video content based upon the estimated positional relationship between the first video camera and the second video camera.

60. The apparatus according to claim 46, where, in being programmed to merge the first video content and the second video content into the 3D video content, the processor is programmed to form the 3D video content as one of side-by-side 3D video content, top-and-bottom 3D video content, and frame sequential 3D video content.

61. The apparatus according to claim 46, where the processor is further programmed to:
receive a request to change a portion of the merged 3D video content;
detect the portion of the merged 3D video content within each of the first video content received from the first video camera and the second video content received from the second video camera; and
change a portion of the first video content received from the first video camera and a portion of the second video content received from the second video camera.

62. The apparatus according to claim 61, where:
the request to change the portion of the merged 3D video content comprises a request to smooth a facial feature of an image of a person represented within the merged 3D video content; and
in being programmed to change the portion of the first video content received from the first video camera and the portion of the second video content received from the second video camera, the processor is programmed to:
smooth the facial feature of the image of the person represented in the first video content received from the first video camera; and
smooth the facial feature of the image of the person represented in the second video content received from the second video camera.

63. The apparatus according to claim 61, where:
the request to change the portion of the merged 3D video content comprises a request to thin a body image of a person represented within the merged 3D video content; and
in being programmed to change the portion of the first video content received from the first video camera and the portion of the second video content received from the second video camera, the processor is programmed to:
thin the body image of the person represented in the first video content received from the first video camera; and
thin the body image of the person represented in the second video content received from the second video camera.

64. The apparatus according to claim 61, where:
the request to change the portion of the merged 3D video content comprises a request to stretch a portion of an image represented within the merged 3D video content; and
in being programmed to change the portion of the first video content received from the first video camera and the portion of the second video content received from the second video camera, the processor is programmed to:
stretch the portion of the image represented in the first video content received from the first video camera; and
stretch the portion of the image represented in the second video content received from the second video camera.

* * * * *